United States Patent
Pouchak et al.

(10) Patent No.: US 6,813,631 B2
(45) Date of Patent: Nov. 2, 2004

(54) AUTOMATIC SELF CONFIGURATION OF CLIENT-SUPERVISORY NODES

(75) Inventors: Michael A. Pouchak, St. Anthony, MN (US); Roger R. Roth, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 872 days.

(21) Appl. No.: 09/738,932

(22) Filed: Dec. 15, 2000

(65) Prior Publication Data

US 2003/0005086 A1 Jan. 2, 2003

(51) Int. Cl.[7] ............................................. G06F 15/16
(52) U.S. Cl. ............................. 709/203; 700/86; 237/7
(58) Field of Search ............................... 709/217, 219, 709/238, 224, 250, 105, 316, 221, 227, 206, 235; 370/230, 466, 389, 352; 700/2, 4, 83, 86, 19; 716/1; 710/29; 345/700–866; 707/5, 10; 455/415; 714/12

(56) References Cited

U.S. PATENT DOCUMENTS

| | | |
|---|---|---|
| 3,865,306 A | 2/1975 | Reuter et al. |
| 3,997,109 A | 12/1976 | Hays |
| 4,084,745 A | 4/1978 | Jones |
| 4,519,540 A | 5/1985 | Boulle et al. |
| 4,638,767 A | 1/1987 | George |
| 4,716,858 A | 1/1988 | Bartels |
| 4,787,554 A | 11/1988 | Bartels et al. |

(List continued on next page.)

OTHER PUBLICATIONS

A Partial Logical Reconstruction of PLAKON/KON-WERK—Schröder, Möller, Lutz (1996) ; kogs–www.informatik.uni–hamburg.de/~moeller/papers/WRKP–KI–96.ps.gz.*

Scalable Session Messages in SRM using Self–configuration—Ry (1998) ; brutus.snu.ac.kr/~hshin/seminar/./fec/modifiedSRM.ps.*

Change Management Needs Integrated Process and Configuration..—Joeris (1997); www.informatik.uni–bremen.de/~joeris/pub/esec97.ps.gz.*

Analysis of Objects with Dynamic and Mulitple Inheritance—Agesen, Palsberg.. (1993) ; self.sunlabs.com/papers/ecoop93a.ps.*

Configuration Management for Distributed Software Services—Crane, Dulay, Fosså..(1995); dse.doc.ic.ac.uk/dse–papers/darwin/isinm95.ps.Z.*

Aster: A Framework for Sound Customization of Distributed..—Issamy, Bidan (1996) ;www.irisa.fr/EXTERNE/projet/solidor/members/../doc/ps96/aster–icdcs96.ps.gz.*

Opportunities and Tools for Highly Interactive..—Eisenhauer, Gu.. (1996) ;www.cc.gatech.edu/systems/papers/Eisenhauer94OAT/PDW.ps.*

A Distributed Operating System for Dynamic..—Kon, Campbell..(2001); choices.cs.uiuc.edu/2k/papers/hpdc2000.ps.gz.*

Primary Examiner—Thong Vu

(57) ABSTRACT

A system of controllers act as nodes on a network. One controller is identified as a supervisory node and the remaining controllers are identified as client nodes with the supervisory node and each client node broadcasting a default identifier, created at the time of manufacture, in a default domain. The default identifiers from the client nodes are received and ranked at the supervisory node according to a characteristic in the identifier. A network address is created at the supervisory node for each client node and broadcast in the default domain to all client nodes. The client nodes receive all network addresses but only recognize and internalize the network address corresponding to a specific client node. Control information is then communicated between nodes utilizing subnet and node addressing.

23 Claims, 28 Drawing Sheets

U.S. PATENT DOCUMENTS

| | | | |
|---|---|---|---|
| 4,850,310 A | | 7/1989 | Wildgen |
| 4,930,488 A | | 6/1990 | Pearman et al. |
| 4,931,948 A | | 6/1990 | Parker et al. |
| 5,042,431 A | | 8/1991 | Shprecher et al. |
| 5,053,978 A | | 10/1991 | Solomon |
| 5,350,114 A | | 9/1994 | Nelson et al. |
| 5,396,546 A | * | 3/1995 | Remillard ................. 379/93.24 |
| 5,442,771 A | * | 8/1995 | Filepp et al. ................ 709/219 |
| 5,490,276 A | | 2/1996 | Doli, Jr. et al. |
| 5,500,852 A | | 3/1996 | Riley |
| 5,513,324 A | | 4/1996 | Dolin, Jr. et al. |
| 5,577,266 A | * | 11/1996 | Takahisa et al. ............ 455/3.06 |
| 5,579,482 A | | 11/1996 | Einkauf et al. |
| 5,689,726 A | * | 11/1997 | Lin .............................. 710/10 |
| 5,713,515 A | | 2/1998 | Adams et al. |
| 5,737,529 A | | 4/1998 | Dolin, Jr. et al. |
| 5,754,779 A | | 5/1998 | Dolin, Jr. et al. |
| 5,797,036 A | * | 8/1998 | Kikinis ......................... 710/38 |
| 5,870,562 A | * | 2/1999 | Butman et al. .............. 709/238 |
| 5,920,698 A | * | 7/1999 | Ben-Michael et al. ...... 709/224 |
| 5,920,699 A | * | 7/1999 | Bare .......................... 709/225 |
| 6,021,752 A | | 2/2000 | Wahle et al. |
| 6,062,485 A | | 5/2000 | Stege et al. |
| 6,109,339 A | | 8/2000 | Talbert et al. |
| 6,490,273 B1 | * | 12/2002 | DeNap et al. ............... 370/352 |
| 6,526,375 B1 | * | 2/2003 | Frankel et al. ................. 703/21 |
| 6,536,678 B2 | * | 3/2003 | Pouchak ........................ 237/7 |
| 6,647,302 B2 | * | 11/2003 | Pouchak ....................... 700/83 |
| 6,687,245 B2 | * | 2/2004 | Fangman et al. ........... 370/356 |
| 6,717,913 B1 | * | 4/2004 | Ghahremani et al. ....... 370/230 |

\* cited by examiner

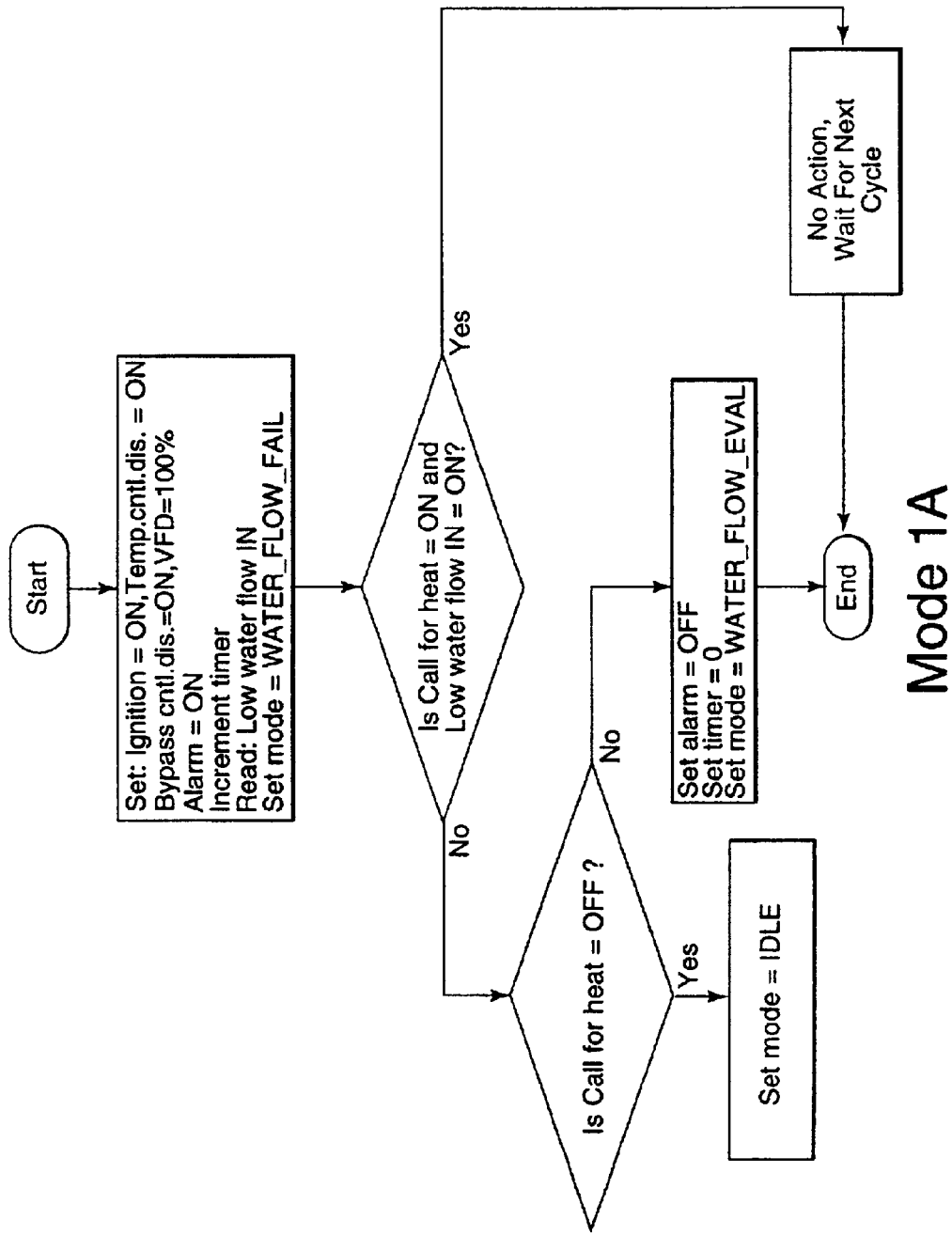

Mode 2

Mode 3A

T3

Mode 4A

T4

Mode 5

Mode 5A

Mode 6

Mode7

Mode 9A

Mode 9B

AUTOMATIC SELF CONFIGURATION OF CLIENT-SUPERVISORY NODES

BACKGROUND OF THE INVENTION

The present invention relates generally to controls and more specifically to communication between control devices or nodes connected in a network. Networks were traditionally used in large computer systems where the communication protocols were designed and optimized for large amounts of data between computers. The declining cost of microprocessors eventually allowed their use in inexpensive controllers and control devices. However, the communication protocols used in large data processing systems did not meet the unique requirements of control networks which typically require frequent communication between devices, short message formats, peer to peer communication and costs consistent with the use of low cost control devices. These requirements lead to the development of protocols designed for use in control networks rather than for use in data processing networks. The applications that use such control networks are many and varied. For example, the controls may be related to heating ventilating and air conditioning (HVAC) applications, lighting control applications, building security applications and many other applications. The present invention is not limited by the nature of the application. Many control manufacturers make control devices that communicate using a particular communication technology, one example of a communication technology is the LonWorks System as provided by the Echelon Corporation. In the simplest installation the control node is typically connected to a single control device in a stand-alone installation. In larger more complex installations a single Supervisory node may send messages to a number of Client nodes and the Client nodes may send messages to the Supervisory node as well as to other Client nodes. In order to initially establish this communication between a Supervisory node and a Client node, it typically requires a technician trained in the use of network tools or configuration tools to be physically present at the network installation site and to assign addresses to the nodes to allow communications between nodes and to configure the nodes. A network installation tool maintains a database of the device addresses for the network assigns the device addresses. Device addresses typically consist of three components: a domain address or ID, subnet ID, and node ID. Therefore, a technician trained in the use of the configuration tool will need to travel to the location of the network installation, coordinate the visit with the availability of other trade persons, e.g. an electrician, at the location and spend time at the location in performing the address assignment and configuration tasks. Depending on how the communication technology is implemented, these tasks may further require visiting each node location to set dip switches or to depress a button as part of the process. In addition to the technician tasks related to simply establishing communication between the nodes there are additional technician tasks. For example, many control nodes can also be configured to be capable of communication and interaction with multiple other nodes of similar design, providing system control and sharing of selected information through the system using a communication technique called "binding". Establishing these relationships between nodes is also accomplished with a configuration tool at the installation site.

The processes just described obviously increases the cost of a network installation.

Self-configuration has been proposed in the past but is usually limited to a very small subset of information and does not meet the need of self-configuration for control networks. Thus a need exists for a network system that will be automatically self configured.

SUMMARY OF THE INVENTION

The present invention solves these and other needs by providing in a first aspect a system of controllers acting as nodes on a network and providing automatic self-configuration. One controller is identified as a supervisory node and the remaining controllers are identified as client nodes with the supervisory node and each client node broadcasting a default identifier in a default domain. The default identifiers are created at the time of manufacture of the node microprocessor. The default identifiers from the client nodes are received and ranked according to a characteristic in the identifier at the supervisory node. A network address is created at the supervisory node for each client node and broadcast in the default domain to all client nodes. The client nodes receive all network addresses but only recognize and internalize the network address corresponding to a specific client node. Control information is then communicated between nodes utilizing subnet and node addressing.

BRIEF DESCRIPTION OF THE DRAWINGS

FIG. 9b is a flowchart illustrating the operation of the BIC invention in the water flow failure mode, mode 1A.

DESCRIPTION OF THE PREFERRED EMBODIMENT

Figure 1:
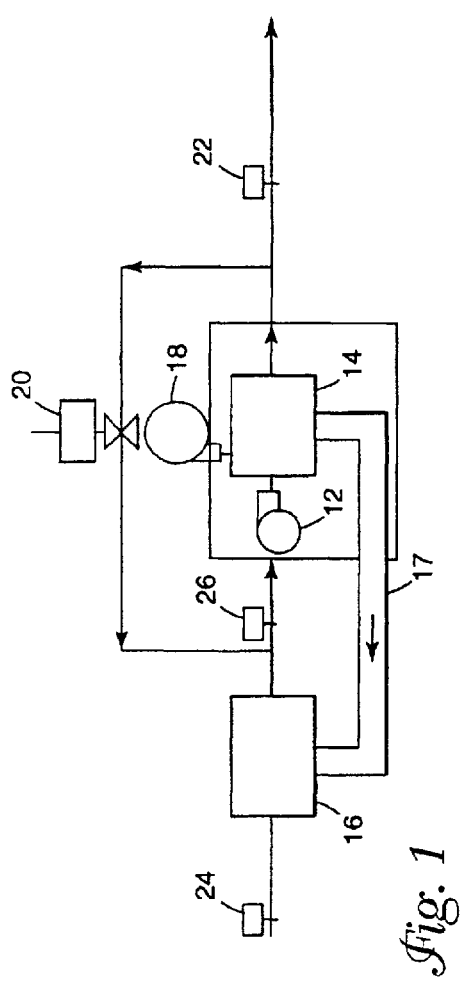
FIG. 1 is a diagram of a single boiler arrangement.

A single boiler arrangement is shown in FIG. 1 including water circulating pump 12, primary heat exchanger 14 and secondary heat exchanger 16 which utilizes combustion waste heat 17. Recirculating valve 20 insures that a minimum water temperature is maintained in the boiler. Supply or outlet water temperature sensor 22, return or inlet water temperature sensor 24, and bypass water temperature sensor 26 are also shown. A variable firing rate is provided for the boiler by variable frequency drive (VFD) combustion/purge blower 18. Other techniques for providing a variable firing rate could be used.

A boiler interface controller (BIC) for use in a single boiler arrangement according to the teachings of the present invention is shown in the figures and generally designated 10. BIC 10 is shown for interfacing with a flame safety controller 30, which provides the required flame safety functions.

BIC 10 in the preferred embodiment employs a Neuron (a registered trademark of Echelon Corp.) microprocessor that is well adapted to building control system networks.

The Neuron Chip Distributed Communications and Control Process includes three 8-bit pipelined processors for concurrent processing of application code and network packets. The 3150 contains 512 bytes of in-circuit programmable EEPROM, 2048 bytes of static Ram, and typically 32768 bytes of external EPROM memory. The 3150 typically uses a 10 MHz clock speed. Input/Output capabilities are built into the microprocessor. The LonWorks® firmware is stored in EPROM and allows support of the application program. The Neuron Chip performs network and application-specific processing within a node. Nodes typically contain the Neuron Chip, a power supply, a communications transceiver, and interface electronics.

The Neuron Microprocessor is part of the LonWorks® technology that is a complete platform for implementing control network systems. The LonWorks networks consist of intelligent devices or nodes that interact with each other, communicating over pre-defined media using a message control protocol.

The processor is programmed using the LonBuilder Workstation hardware and software in Neuron-C (the language for the Neuron chip). The firmware application is developed using the LonBuilder development station. Typically the application generated by the LonBuilder Development software environment is compiled and stored in the custom EPROM for use by the node during execution. Certainly other microprocessors may be employed, but the programming will have to be appropriately modified.

Figure 2:
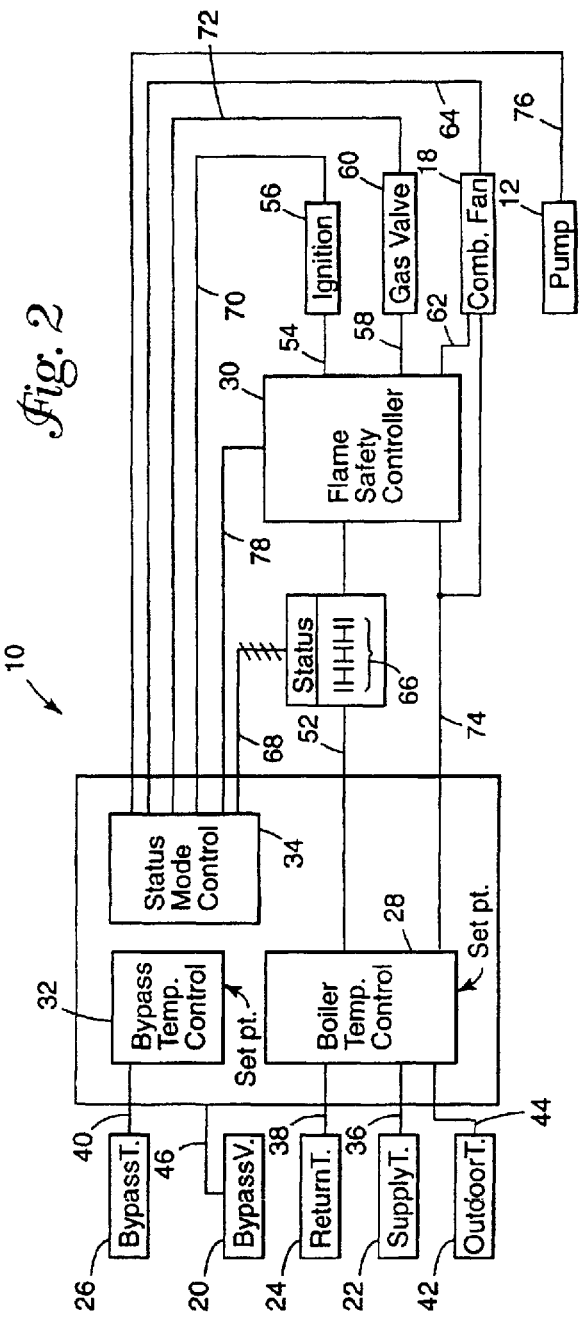
FIG. 2 is a functional block diagram of a Boiler Interface Controller (BIC) according to the principles of that invention.

Various control modules are implemented in firmware in BIC 10 as is shown in a single boiler configuration in FIG. 2 including boiler temperature control module 28, bypass temperature control module 32, and status and mode control module 34. BIC 10 is shown interfacing to various elements of a boiler control system for controlling a boiler for heating a medium which is typically water. Temperature control module 28 receives signal 36 from sensor 22 located in the boiler supply water, signal 38 from sensor 24 located in the boiler return water, and signal 44 from sensor 42 located in outdoor air. Boiler temperature control module 32 also provides for receiving a setpoint signal related to a desired control set point signal. Bypass temperature control module 32 receives signal 40 from bypass temperature sensor 26 and provides signal 46 to bypass valve 20. Module 32 provides for receiving a set point signal.

BIC 10 as well as the Human Interface Panel and the Fault Tolerant Multi-Boiler Sequencer described herein may be prepared for a particular boiler installation using a configuration tool which is external to BIC 10.

Flame safety controller 30 provides an ignition command 54 to ignition element 56, a gas valve command 58 to gas valve 60 and a variable frequency drive (VFD) command 62 to variable speed combustion/purge motor 18.

BIC 10 provides a request for heat signal 52 to flame safety controller 30 through boiler safety devices but BIC 10 does not perform flame safety functions. While BIC 10 does not perform flame safety functions, it does receive status information from boiler safety switches 66 and other devices. Typical safety switches relate to proving water flow is present, supply gas pressure is not too high or too low, combustion purge pressure is not to high or too low and a condensate drain is not blocked. These boiler safety status signals may be provided by an auxiliary contact (not shown) for each of contact closures 66 related to each of the four (4) safety switches. Safety switch status signals would be provided on conductors 68. The order in which such auxiliary contacts are electrically connected is to be coordinated with the order of the modes described herein. Status and mode control module 34 of BIC 10 in its preferred form receives signal 70 as to the "on" or "off" status of ignition element 56, signal 72 as to the "on" or "off" status of gas valve 60, signal 64 as to the status of combustion/purge fan 18, signal 76 as to the status of pump 12 and signal 78 as to the status of flame safety controller 30. Boiler temperature control module 28 of BIC 10 provides a VFD speed control signal 74 to variable speed combustion/purge motor 18.

Now that certain aspects of BIC 10 have been disclosed, the operation can be set forth and appreciated. Boiler temperature control module 28 utilizes supply water temperature signal 36, outdoor air temperature signal 44 (optional), the setpoint of module 28 and an internal algorithm to cause an internal call for heat condition within BIC 10 and to issue external request for heat signal 52. As an alternative, a space temperature sensor could have been connected as an input to module 28 to allow the internal call for heat condition to be a function of space temperature.

Figure 7A:
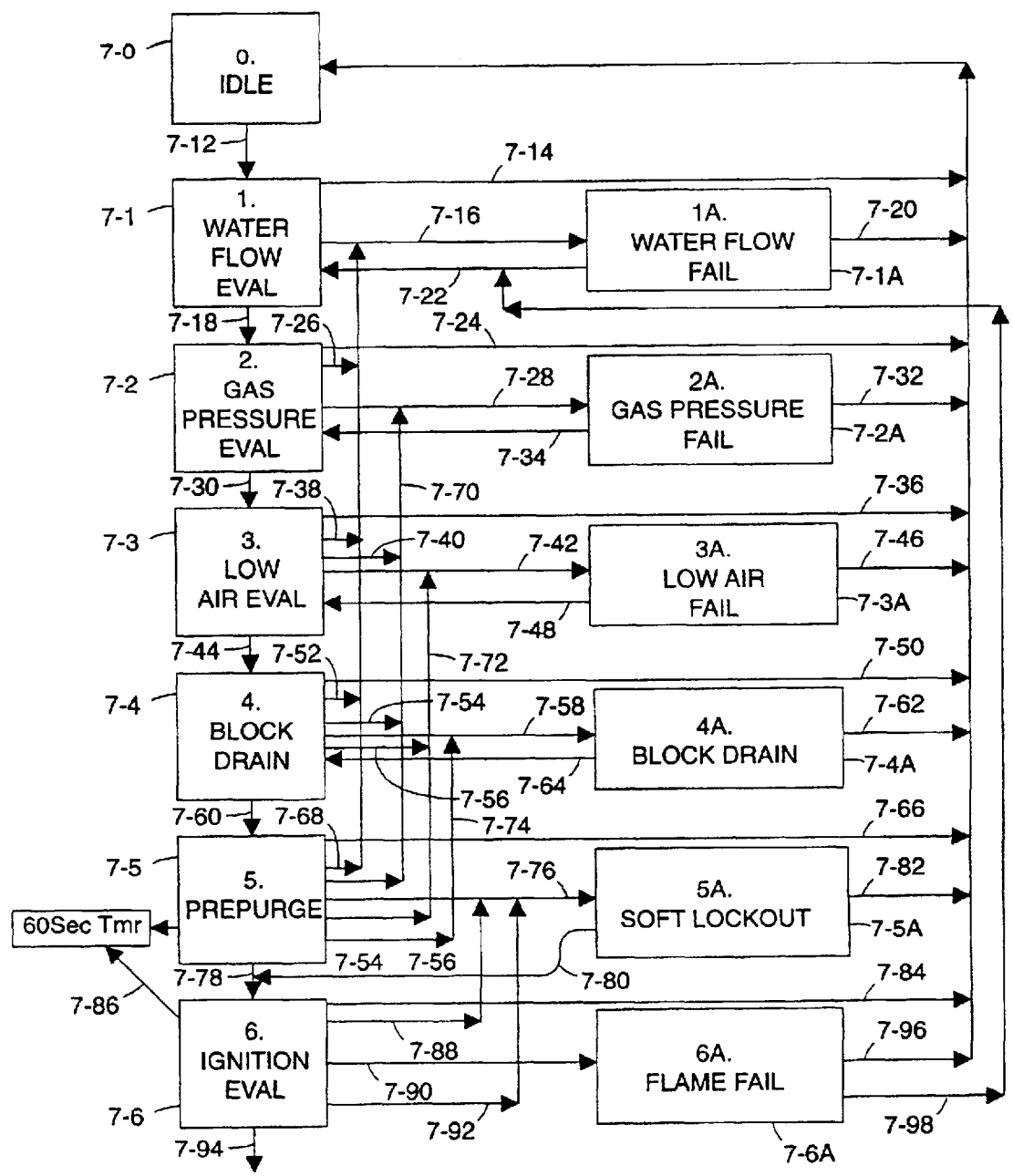
FIG. 7a and FIG. 7b are a diagram illustrating an overview of the operation of the BIC invention of FIG. 2.
Figure 7B:
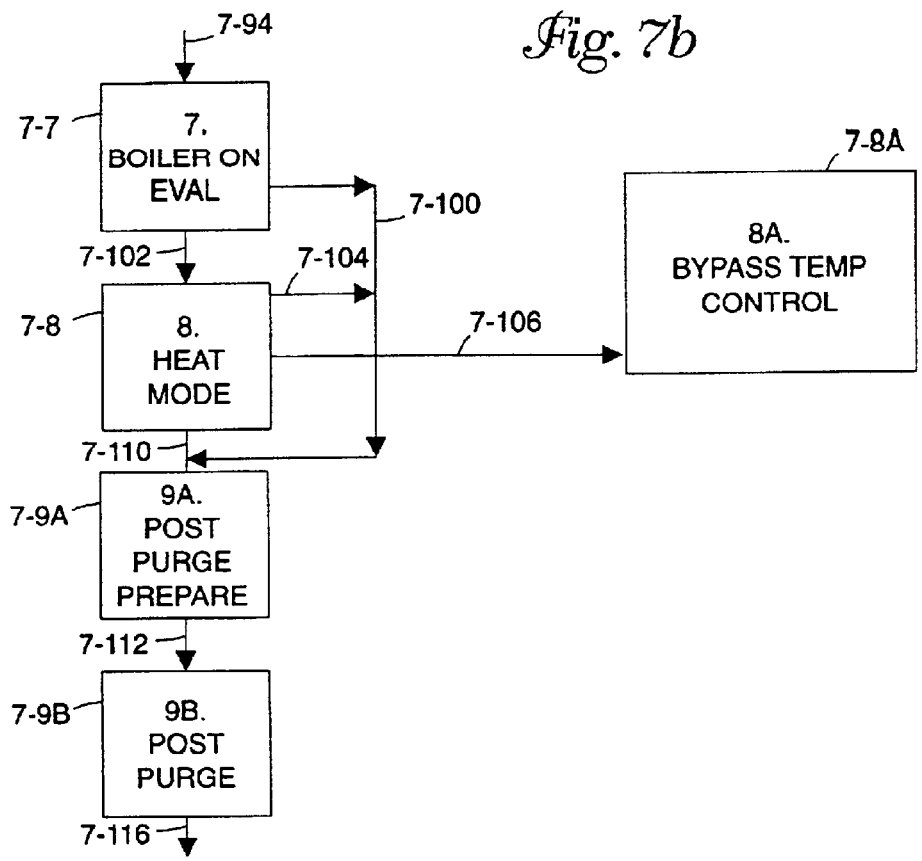

The operation of BIC 10 is best understood by reference to the state diagram shown in FIG. 7*a* and FIG. 7*b,* which identifies the modes and transitions between modes and then by reference to a flowchart that provides the details of a specific mode. In general, the BIC mode state transition diagram is intended to be used in a task scheduled environment. The scheduling mechanism should schedule the state transition software to run on a regular nominal 1-second interval.

In the preferred embodiment, the state information is stored between task executions in the nvoData.Mode variable to maintain the last known boiler state. This will allow the software executive to multi-task and perform other operations between successive state transition tasks, and allow other functions to be performed without loosing the last known state of the boiler. This allows efficient use of the host microprocessor and computer system resources.

The various modes are designated in FIGS. 7*a* and 7*b* by a reference numeral corresponding to the mode designation preceded by the numeral 7, for example mode 1 is designated as 7-1. For simplicity it may also be referred to herein as Mode 1. With reference to FIG. 7*a,* in Mode 0, Idle mode, the BIC has no call for heat and is awaiting a signal to start heating. If the call for heat is on, then initiate transition 7-12 to mode 1, water flow evaluation. The order of electrical wiring of boiler safety switches, for example water flow and gas pressure, is to correspond with the order of the modes related to these switches.

Transitions out of Mode 1: If the call for heat is off, then initiate transition 7-14 to mode 0. If the Low Water Flow input is on and has been on for a predetermined time, then initiate transition 7-16 to Mode 1A, Water Flow Fail Mode. If the Low Water flow input is satisfactory, then initiate transition 7-18 to Mode 2, Gas Pressure Evaluation.

Transitions out of Mode 1A: If the call for heat is off, then initiate transition 7-20 to mode 0. If the Low Water flow input returns to off, then initiate transition 7-22 to Mode 1.

Transitions out of Mode 2: If the call for heat is off, then initiate transition 7-24 to mode 0. If the Low Water Flow input is low, then initiate transition 7-26 to Mode 1A. If The Gas Pressure Fail input is ON, then initiate transition 7-28 to mode 2A Gas Pressure Fail. If the gas pressure fail input is off and all tests are complete, then initiate transition 7-30 to mode 3, Air Pressure Evaluation.

Transitions out of Mode 2A: If the call for heat is off, then initiate transition 7-32 to mode 0. If the Gas Pressure Fail input is OFF, then initiate transition 7-34 to Mode 2.

Transitions out of mode 3: If the call for heat is off, then initiate transition 7-36 to mode 0. If the Low Water Flow input is low, then initiate transition 7-38 to Mode 1A. If The Gas Pressure Fail input is ON, then initiate transition 7-40 to mode 2A. If the Low air input is ON, then initiate transition 7-42 to mode 3A Low Air Fail. If Low air input is off, and all tests are complete, then initiate transition 7-44 to Mode 4 Block Drain.

Transitions out of Mode 3A: If the call for heat is off, then initiate transition 7-46 to mode 0. If the Low air input is off then initiate transition 7-48 to Mode 3.

Transitions out of Mode 4: If the call for heat is off, then initiate transition 7-50 to mode 0. If the Low Water Flow input is on, then initiate transition 7-52 to Mode 1A. If The Gas Pressure Fail input is on, then initiate transition 7-54 to mode 2A. If the Low air input is on, then initiate transition 7-56 to mode 3A. If Block drain input is on, then initiate transition 7-58 to Mode 4A Block Drain. If Block drain input is off, and all tests are complete then initiate transition 7-60 to Mode 5, Prepurge.

Transitions out of Mode 4A: If the call for heat is off, then initiate transition 7-62 to mode 0. If the Low air input is off then initiate transition 7-64 to Mode 4.

Transitions out of Mode 5: If the call for heat is off, then initiate transition 7-66 to mode 0. If the Low Water Flow input is on, then initiate transition 7-68 to Mode 1A. If The Gas Pressure Fail input is on, then initiate transition 7-70 to mode 2A. If the Low air input is on, then initiate transition 7-72 to mode 3A. If Block drain input is on, then initiate transition 7-74 to Mode 4A Block Drain. Refer to flowcharts for information on transition 7-76 to Mode 5A, Soft Lockout and transition 7-78 to Mode 6, Ignition Evaluation.

Transition out of Mode 5A: If the call for heat is off, then initiate transition 7-82 to Mode 0. Refer to flowcharts for conditions for transition 7-80. Transitions out of Mode 6: Refer to flow charts for conditions for transition 7-88 to Mode 5A, transition 7-92 to Mode 5A, transition 7-90 to Mode 6A, transition 7-86 to 60 Sec timer and transition 7-94 to Mode 7 Boiler On Evaluation.

Transitions out of Mode 6A: If the call for heat is off, then initiate transition 7-96 to mode 0. If the Low Water Flow input is on, then initiate transition 7-98 to Mode 1A

Transitions out of Mode 7: Refer to flow charts for conditions for transition 7-100 to Mode 9A, Post Purge Prepare, and transition 7-102 to Mode 8, Heat.

Transitions out of Mode 8: Refer to flow charts for transition 7-104 to Mode 9, Bypass Temp Control, and transition 7-110 to Mode 9A Post Purge Prepare. 8A, Bypass Temperature Control represents the control of valve 20 from bypass temperature 26 and bypass temperature control 32.

Transitions out of Mode 9A: Refer to flow chart for transition 7-112 to Mode 9B, Post Purge.

Transitions out of Mode 9B: When Post Purge timer expires, initiate transition to Mode 0, Idle.

Figure 8:
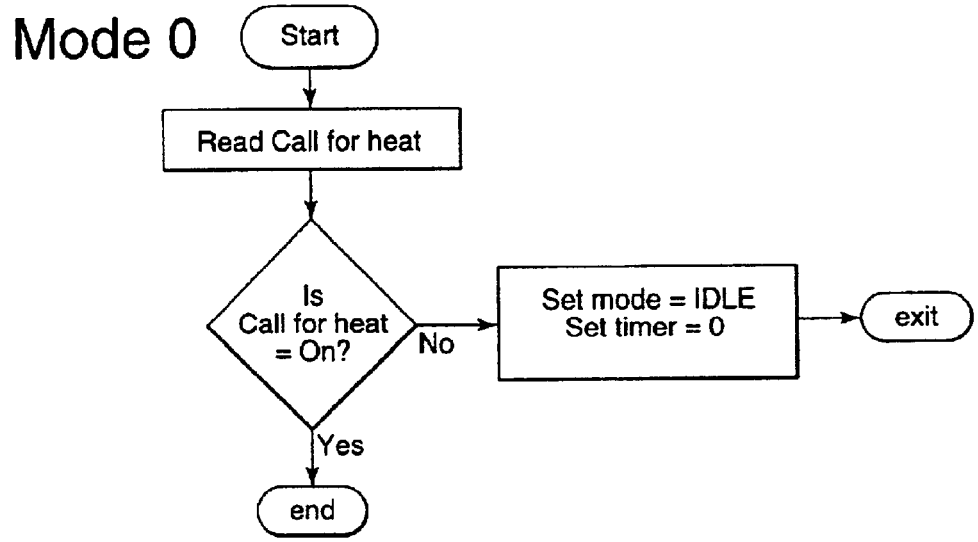
FIG. 8 is a flowchart diagram illustrating the operation of the BIC invention in the idle mode, mode 0.
Figure 9A:
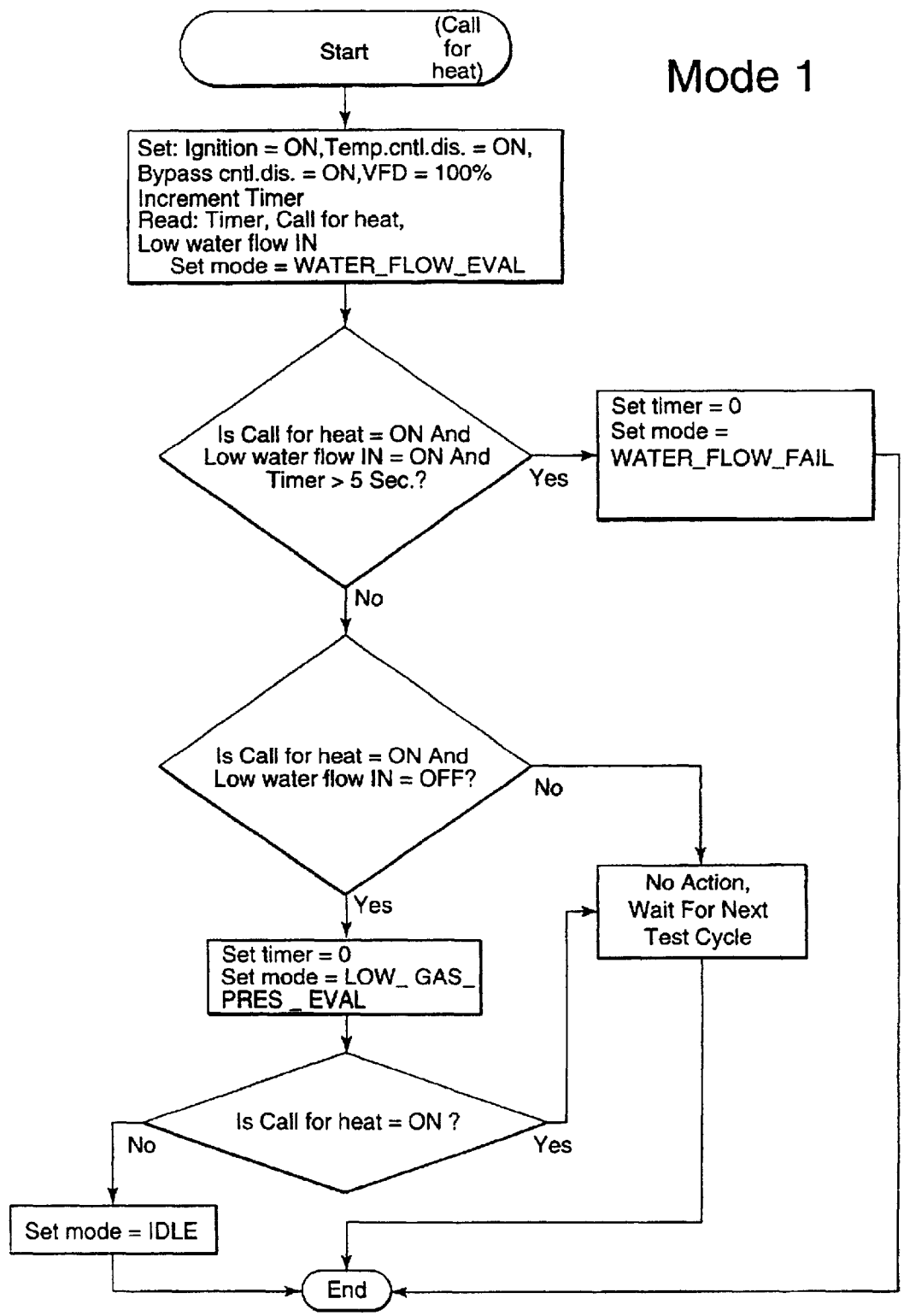
FIG. 9a is a flowchart illustrating the operation of the BIC invention in the water flow evaluation mode, mode 1.
Figure 9C:
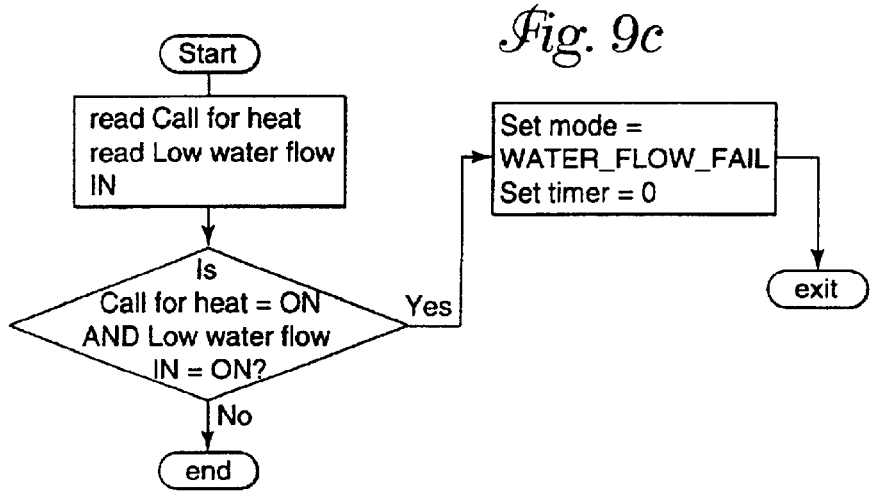
FIG. 9c is a flowchart illustrating the operation of the BIC invention in a water flow test routine, T1.
Figure 10A:
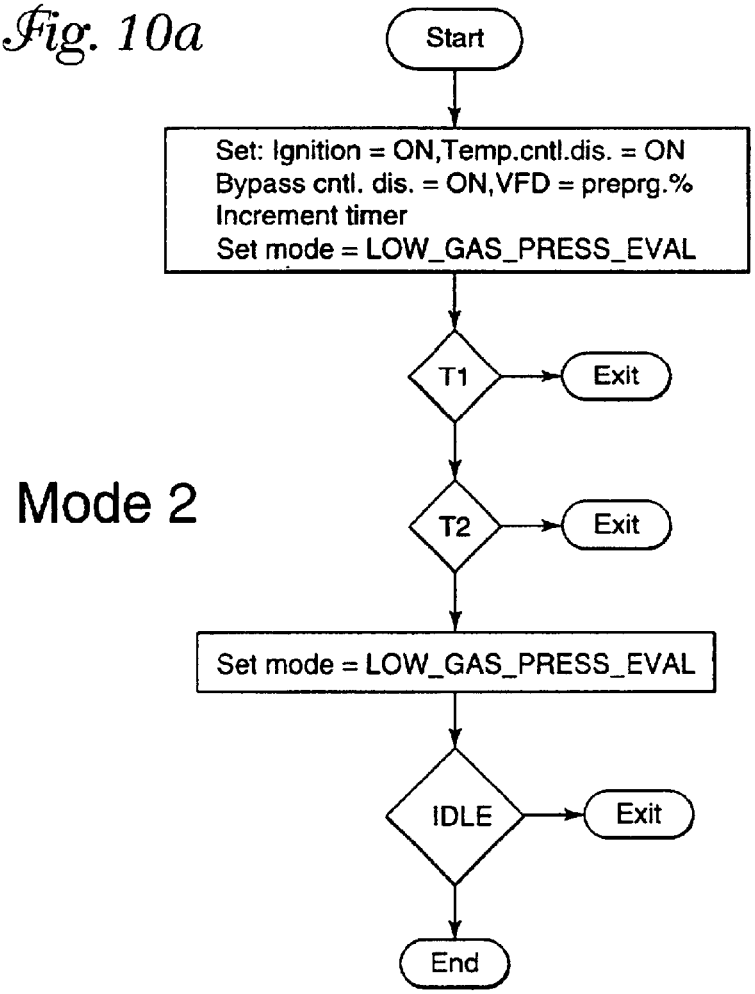
FIG. 10a is a flowchart illustrating the operation of the BIC invention in the low gas pressure evaluation mode, mode 2.
Figure 10B:
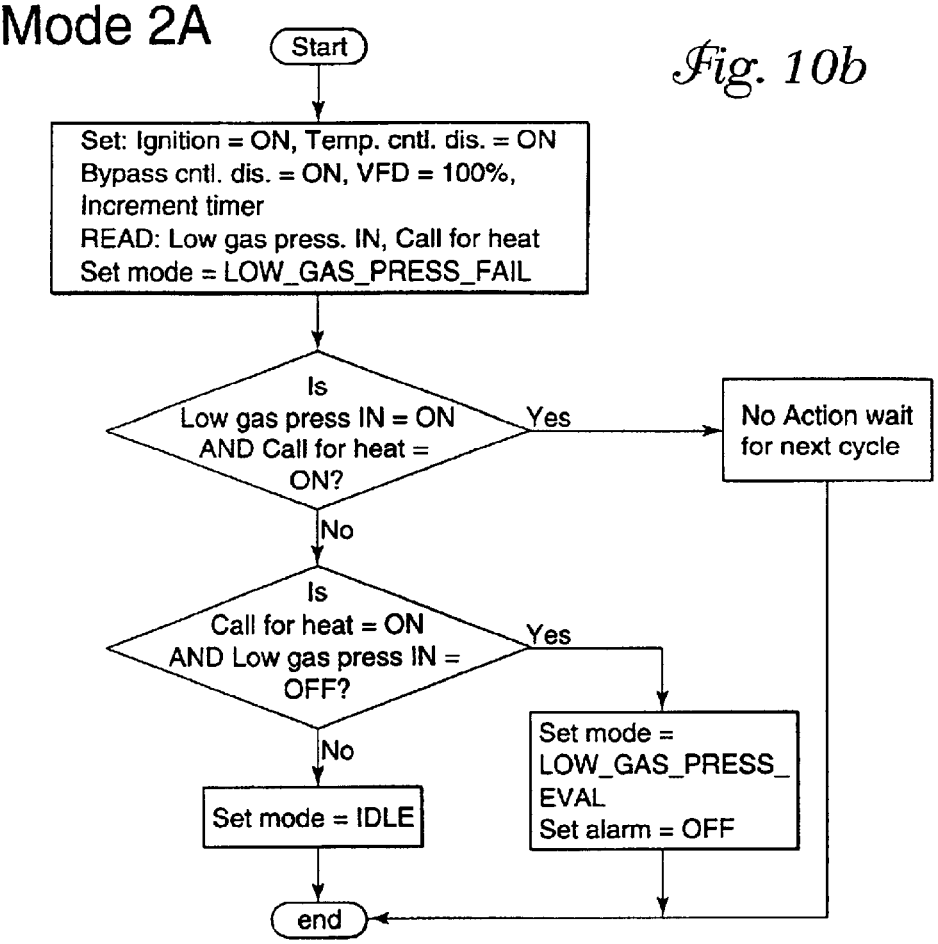
FIG. 10b is a flowchart illustrating the operation of the BIC invention in the low gas pressure failure mode, mode 2A.
Figure 10C:
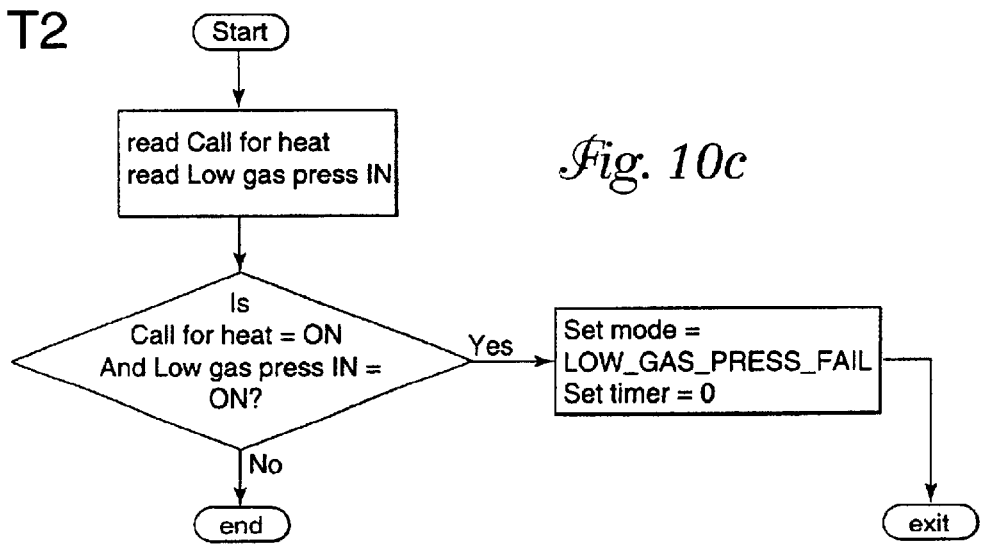
FIG. 10c is a flowchart illustrating the operation of the BIC invention in a low gas pressure test routine, T2.
Figure 11A:
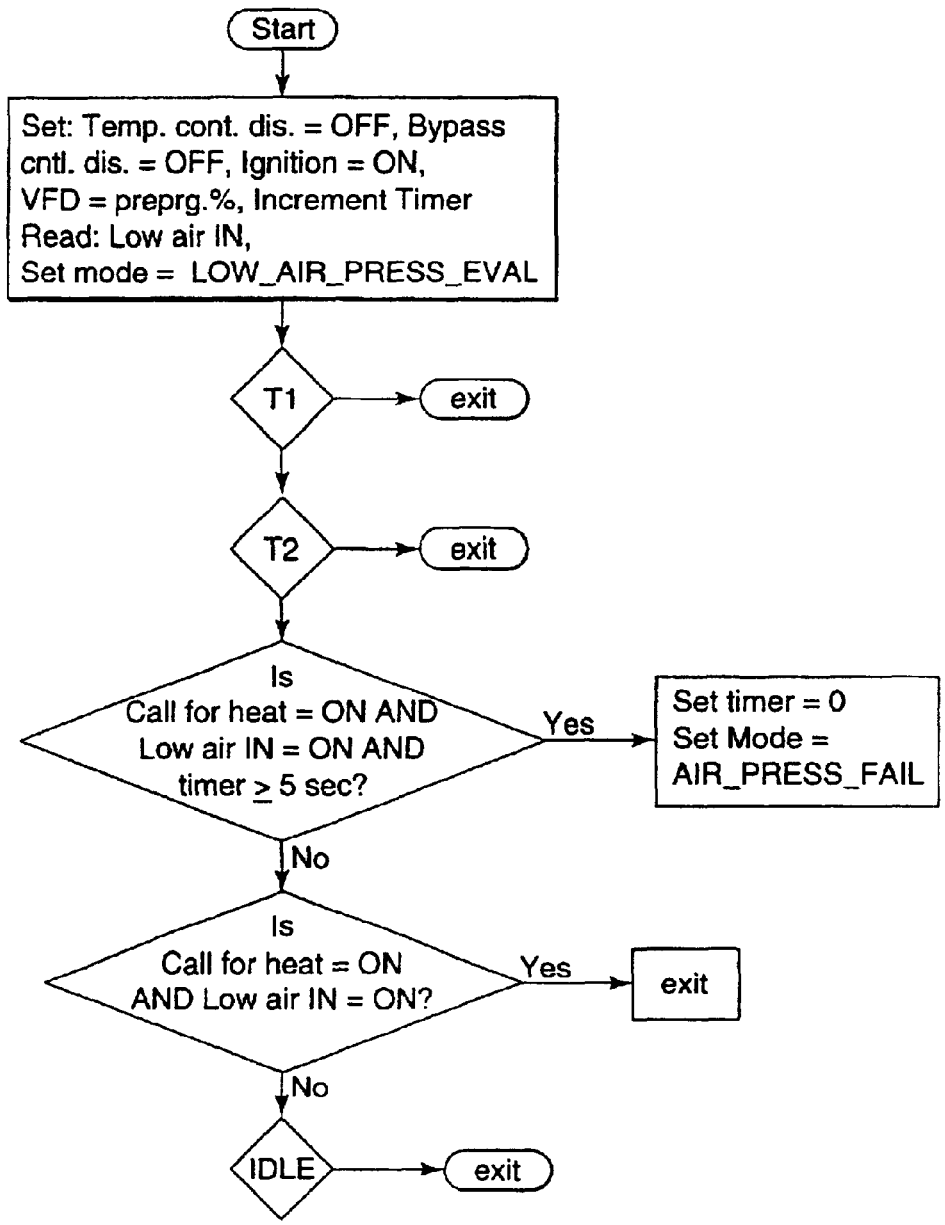
FIG. 11a is a flowchart illustrating the operation of the BIC invention in the low air evaluation mode, mode 3.
Figure 11B:
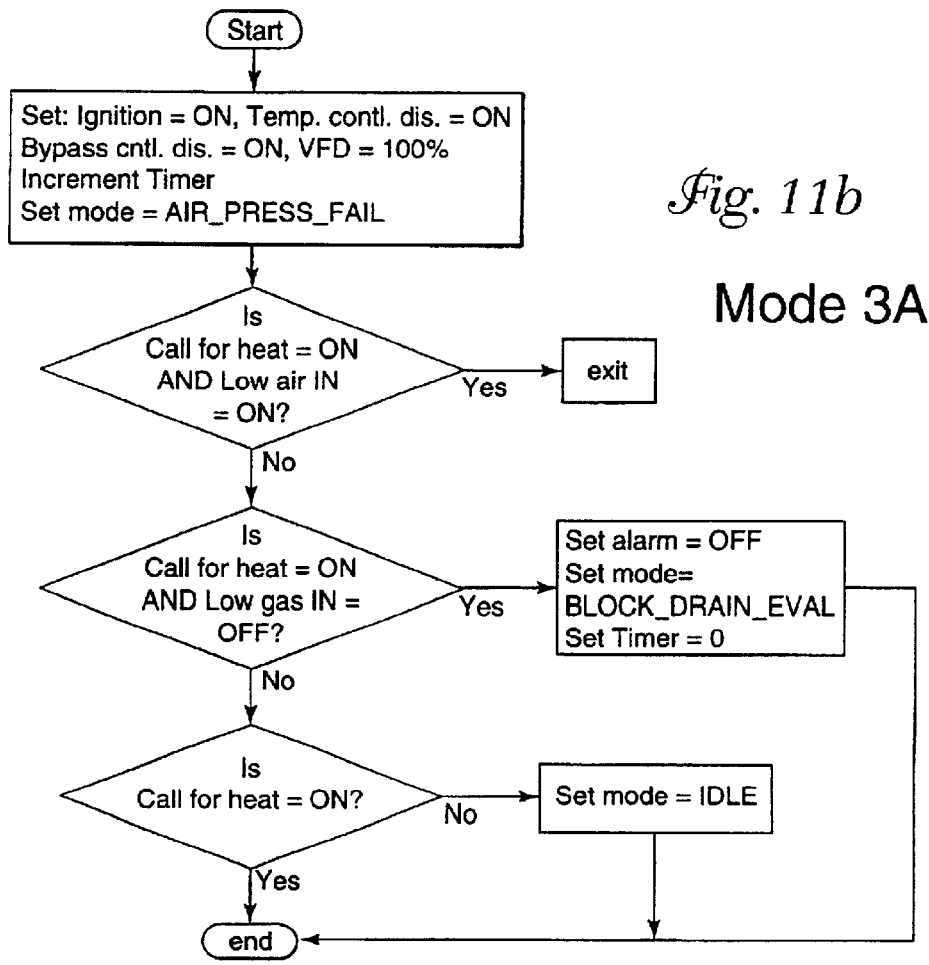
FIG. 11b is a flowchart illustrating the operation of the BIC invention in the low air failure mode, mode 3A.
Figure 11C:
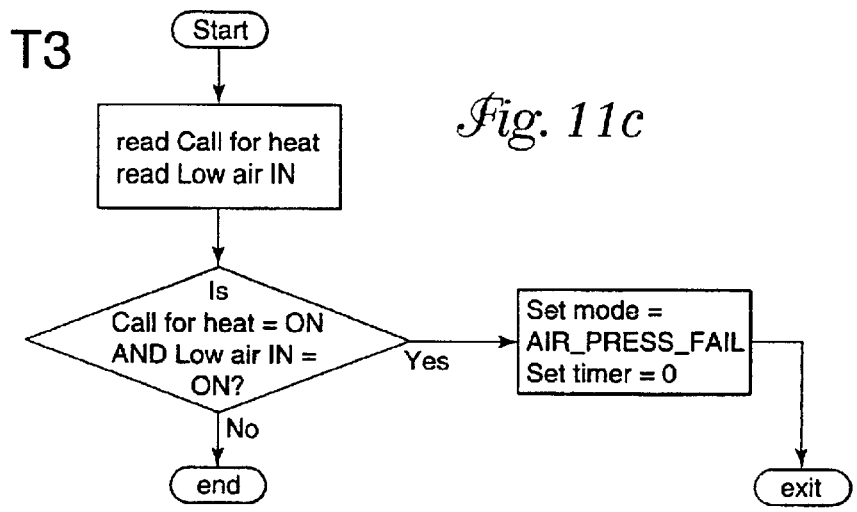
FIG. 11c is a flowchart illustrating the operation of the BIC invention in a low air test routine, T4.
Figure 12A:
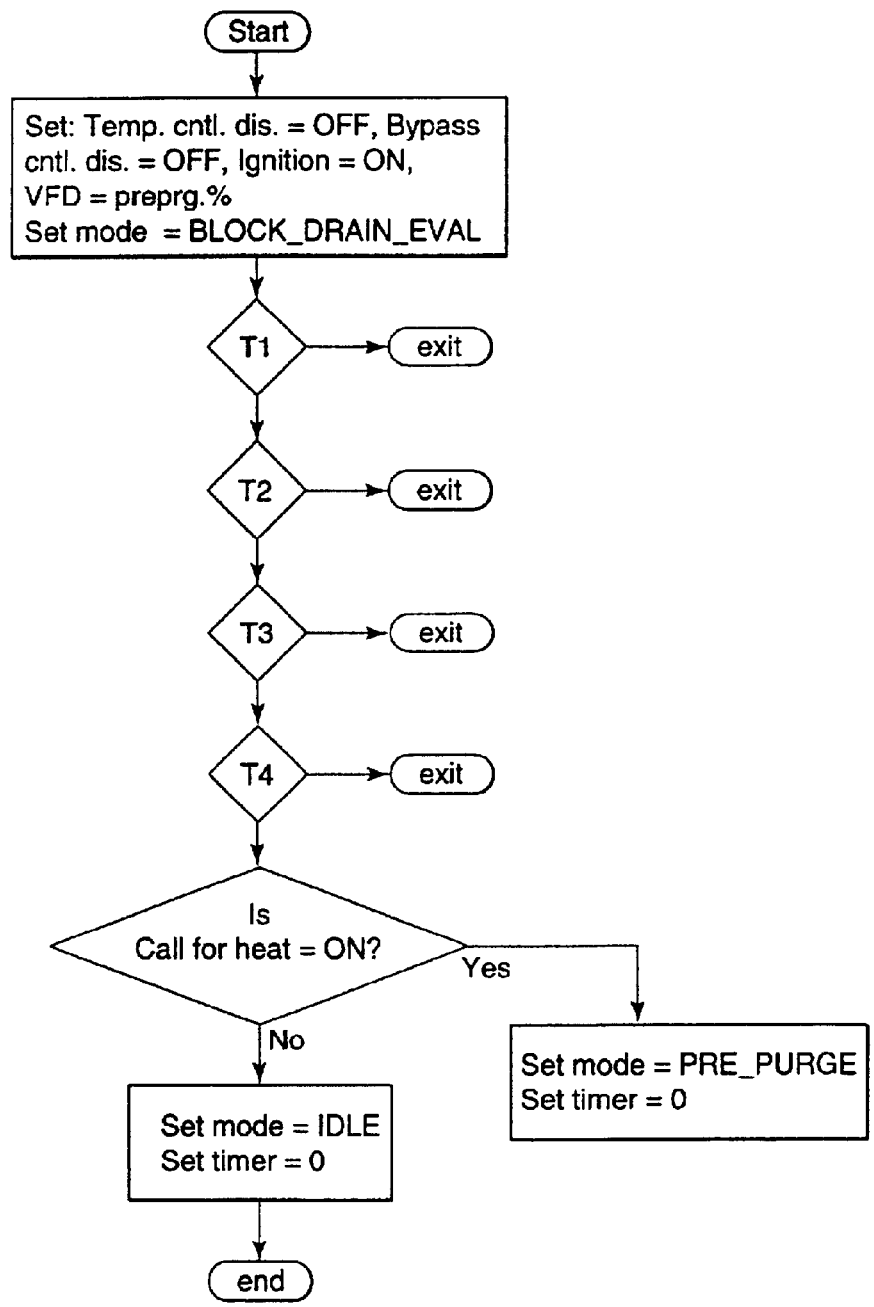
FIG. 12a is a flowchart illustrating the operation of the BIC invention in the blocked drain evaluation mode, mode 4.
Figure 12B:
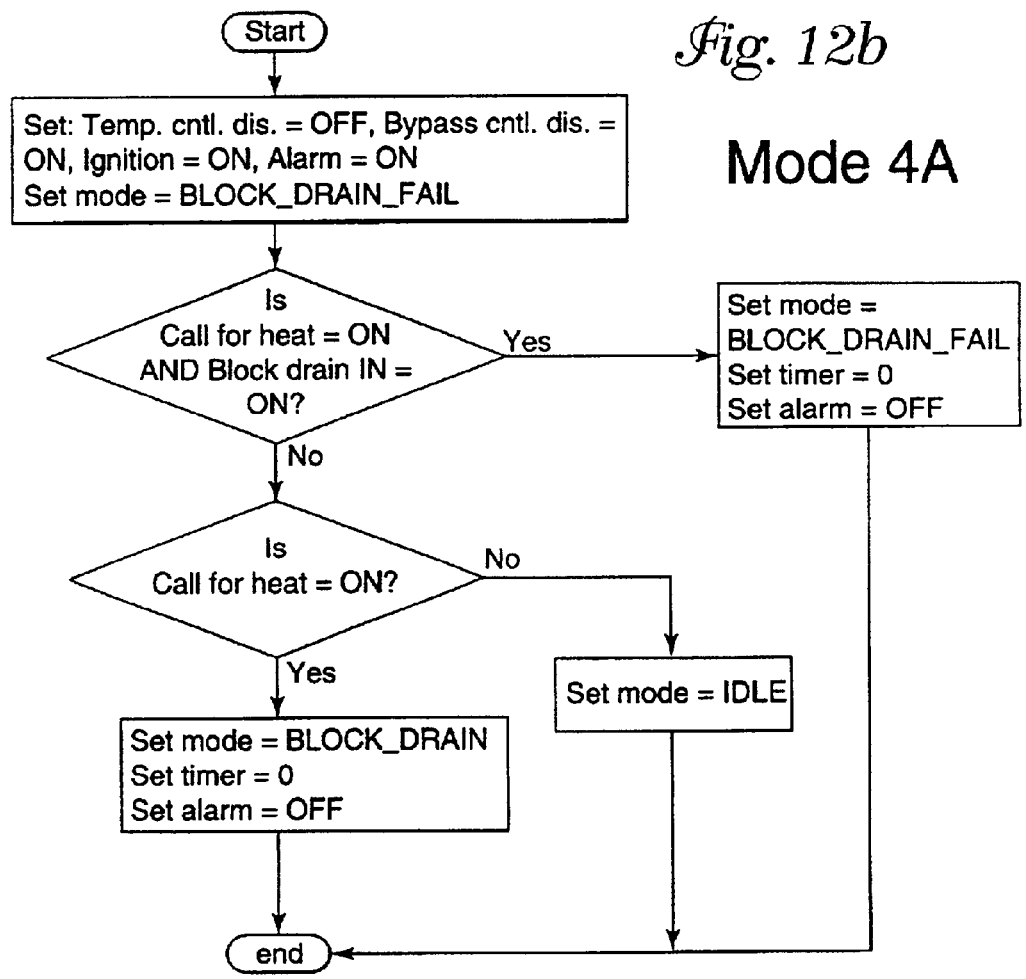
FIG. 12b is a flowchart illustrating the operation of the BIC invention in the blocked drain failure mode, mode 4A.
Figure 12C:
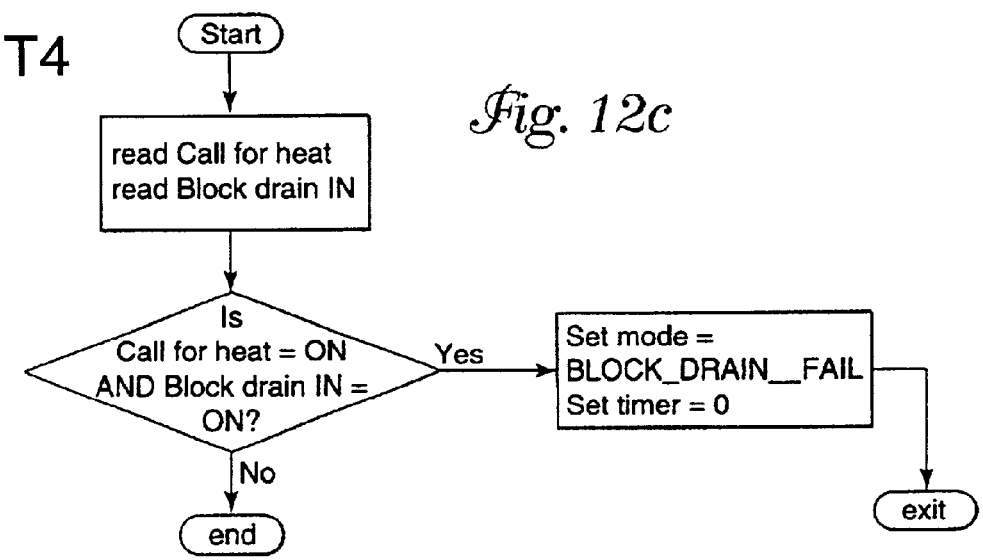
FIG. 12c is a flowchart illustrating the operation of the BIC invention in a blocked drain test routine, T4.
Figure 13A:
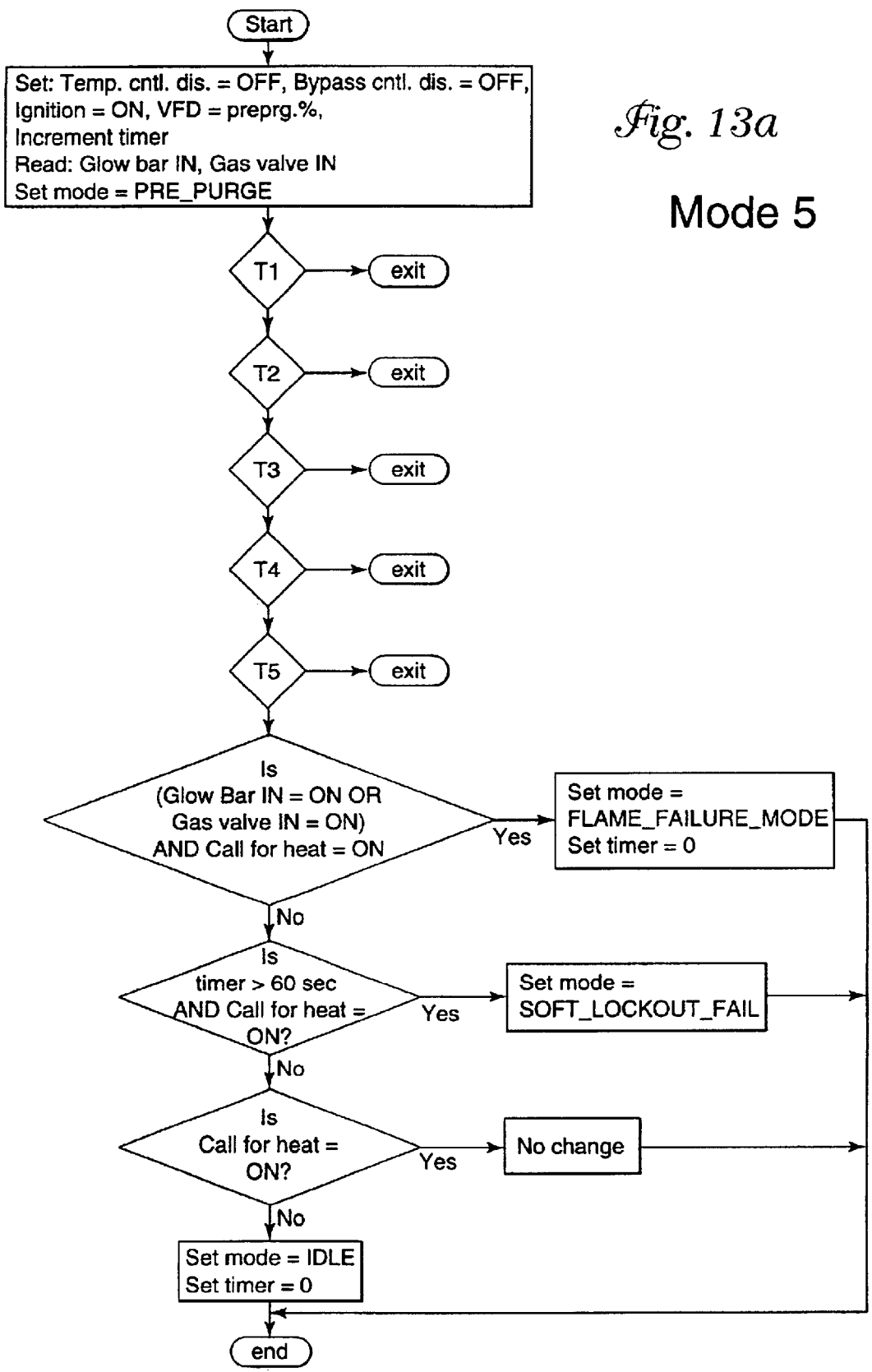
FIG. 13a is a flowchart illustrating the operation of the BIC invention in the prepurge evaluation mode, mode 5.
Figure 13B:
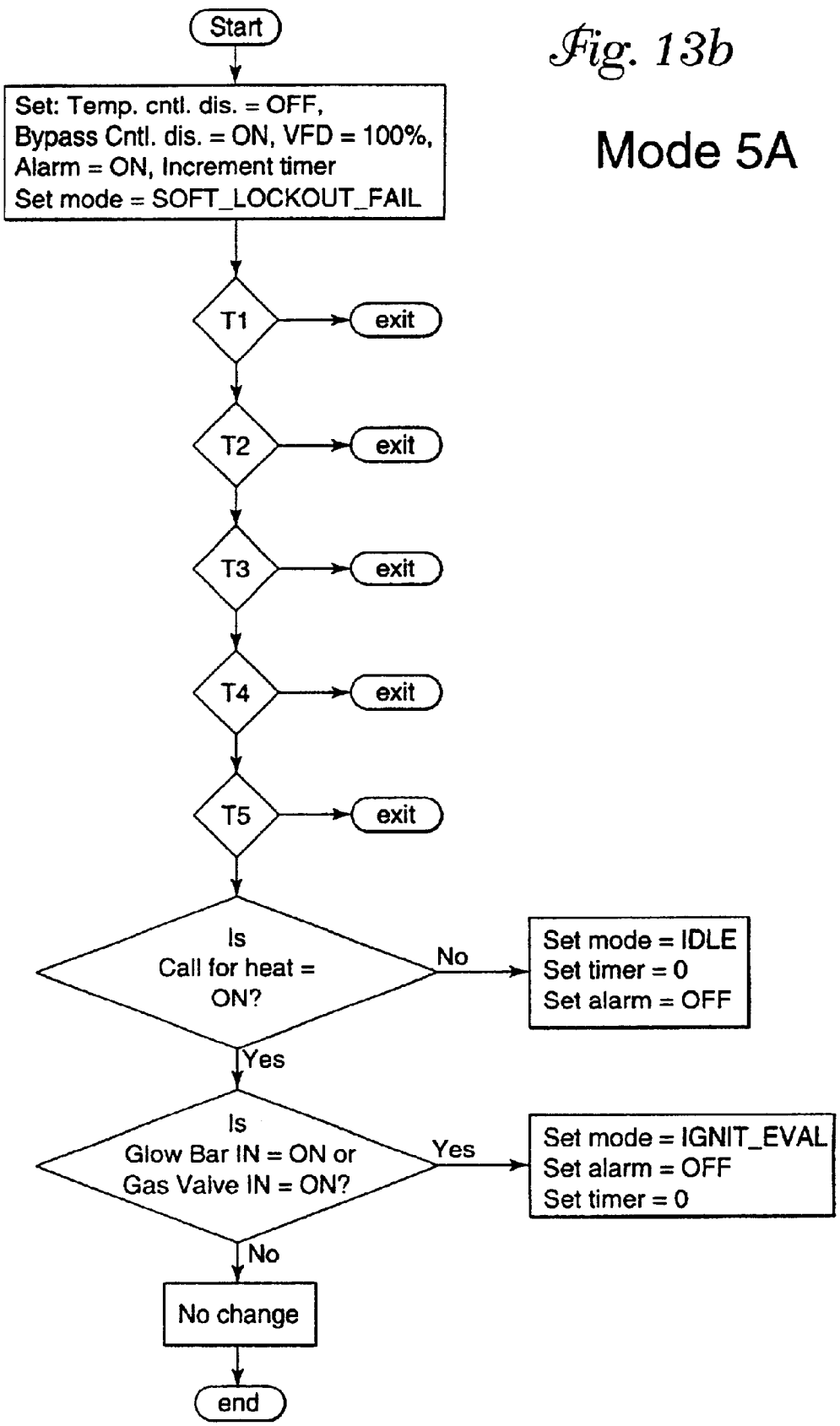
FIG. 13b is a flowchart illustrating the operation of the BIC invention in the soft lockout mode, mode 5A.
Figure 14A:
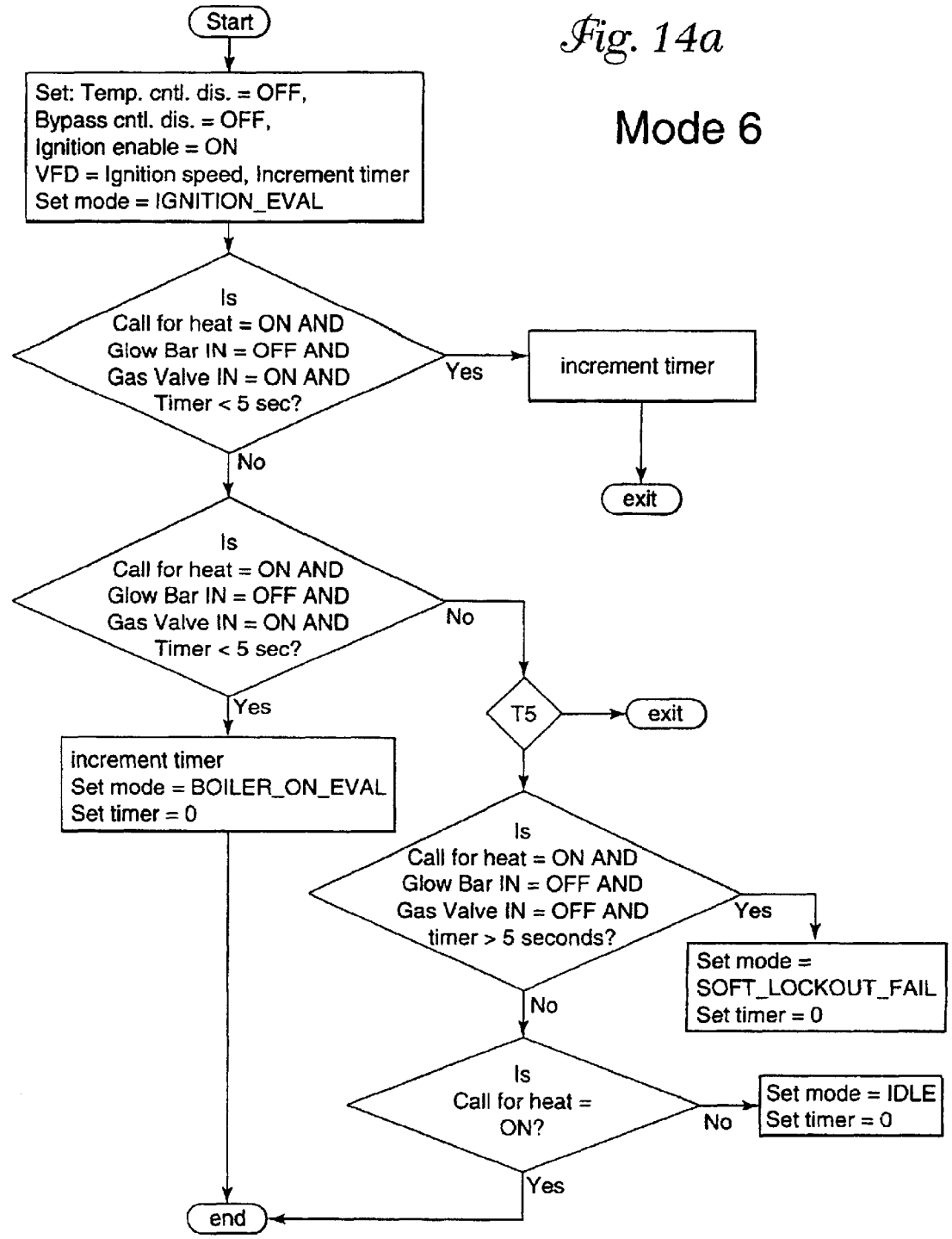
FIG. 14a is a flowchart illustrating the operation of the BIC invention in the ignition evaluation mode, mode 6.
Figures 14B, 14C:
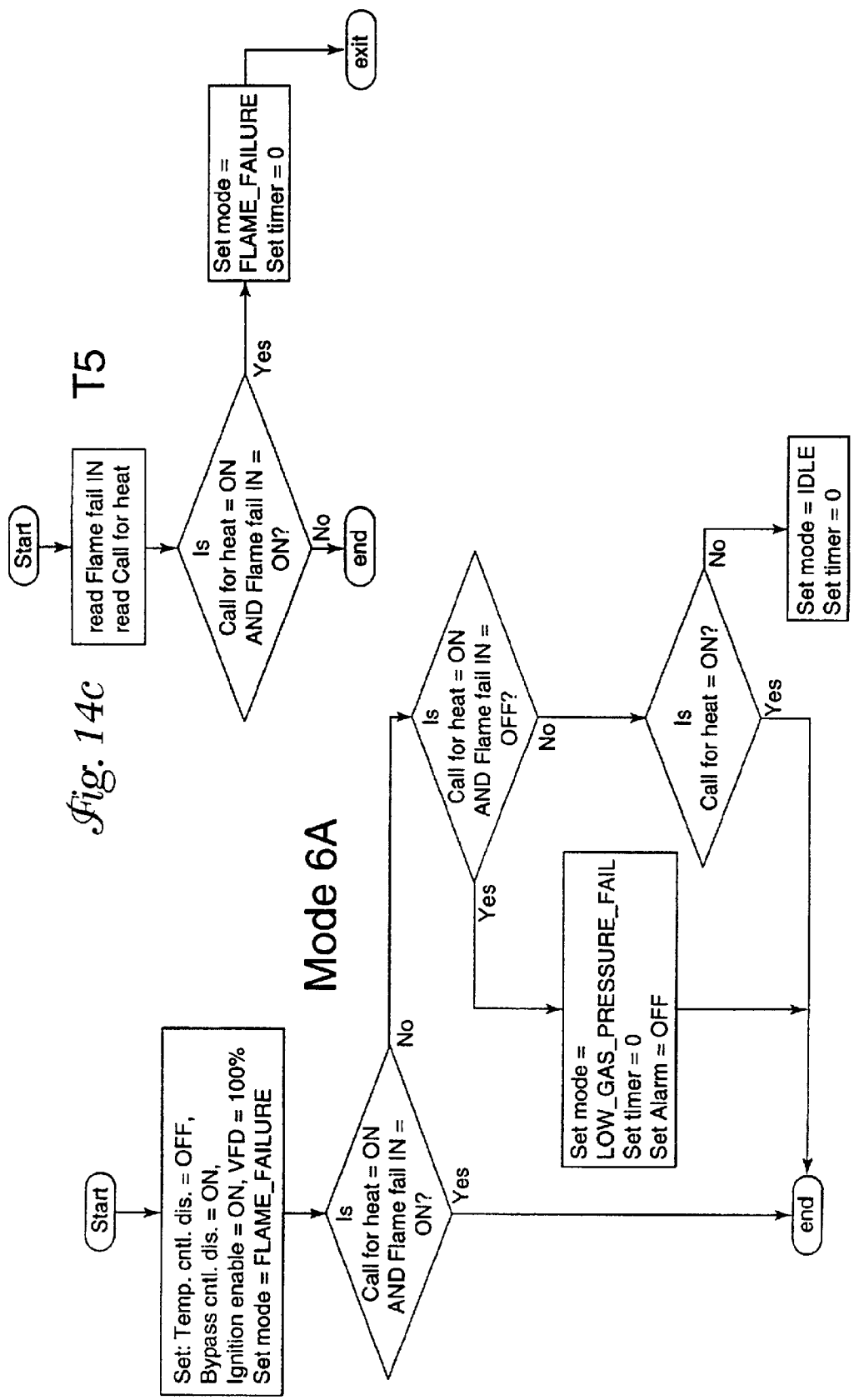
FIG. 14b is a flowchart illustrating the operation of the BIC invention in the flame failure mode, mode 6A.
FIG. 14c is a flowchart illustrating the operation of the BIC invention in a flame failure test routine, T5.
Figure 15:
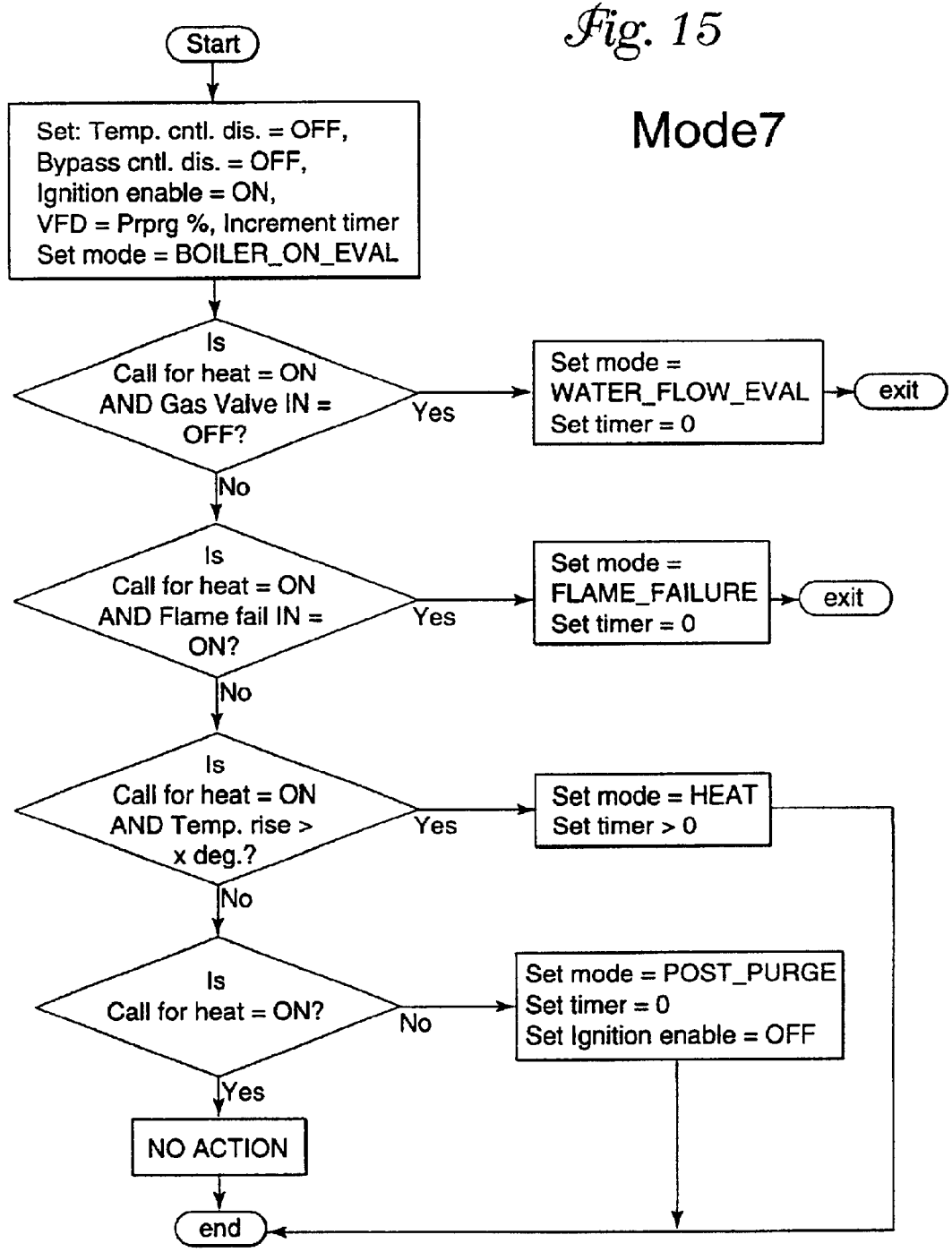
FIG. 15 is a flowchart illustrating the operation of the BIC invention in the boiler on evaluation mode, mode 7.
Figure 16:
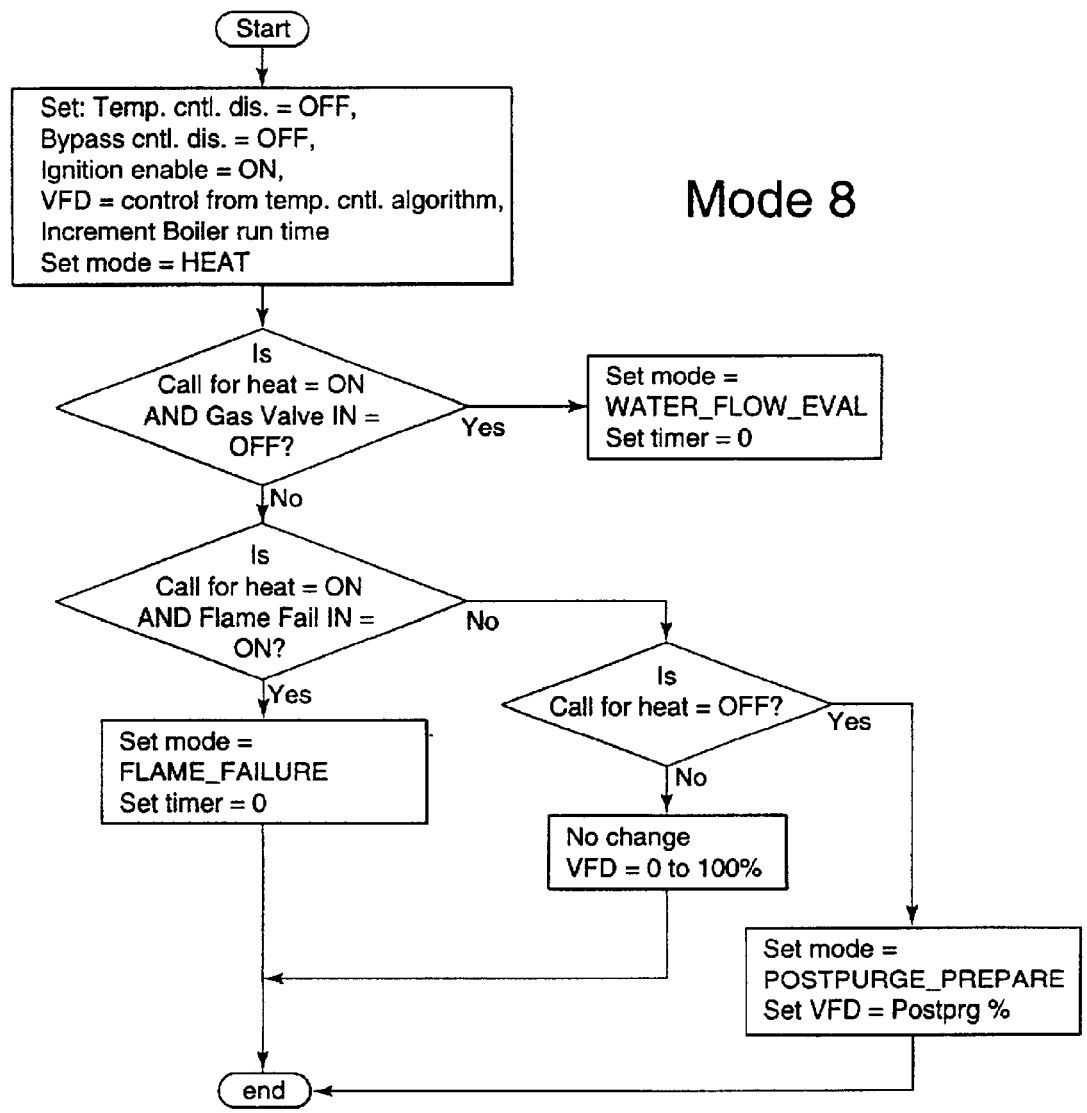
FIG. 16 is a flowchart illustrating the operation of the BIC invention in the heat mode, mode 8.
Figure 17:
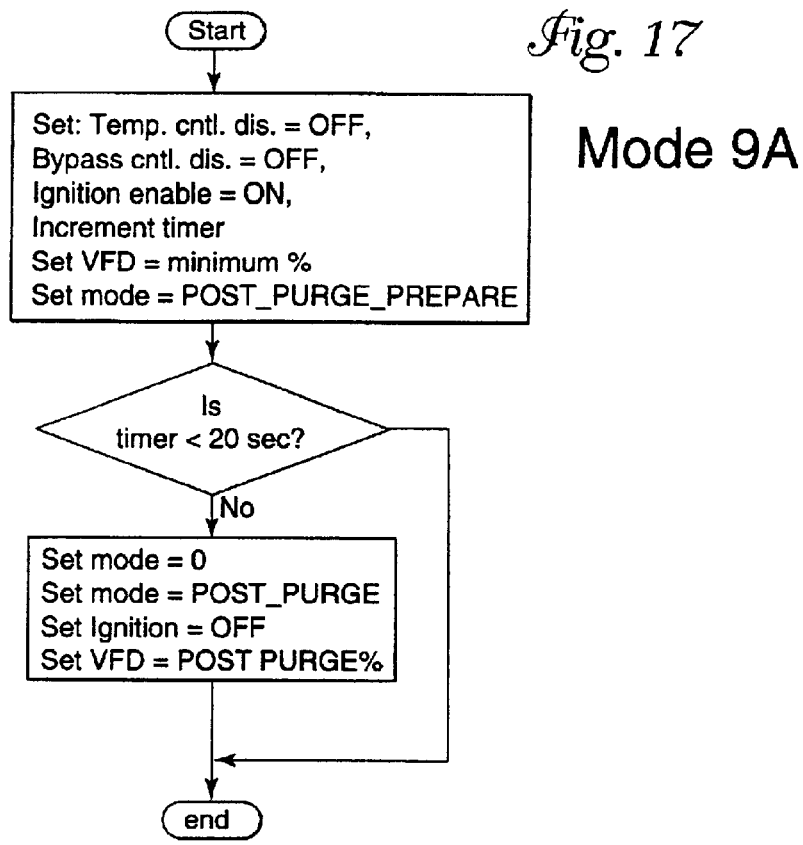
FIG. 17 is a flowchart illustrating the operation of the BIC invention in the post purge preparation mode, mode 9A.
Figure 18:
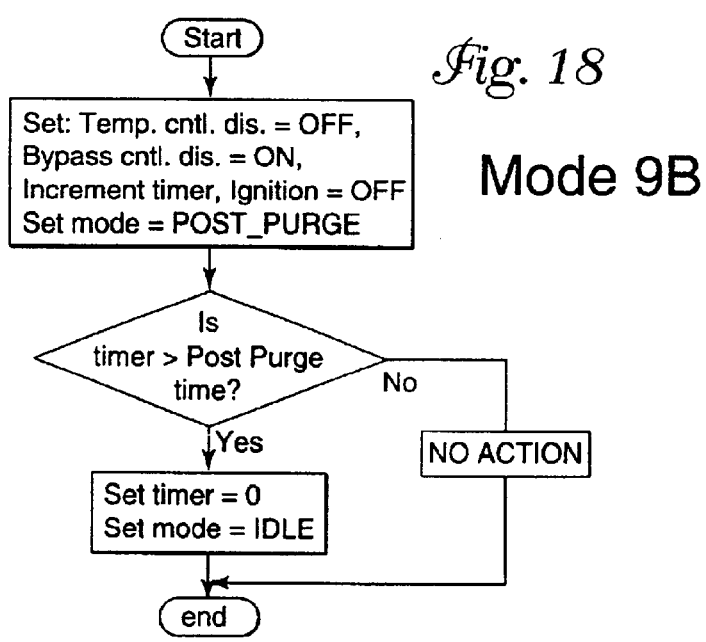
FIG. 18 is a flowchart illustrating the operation of the BIC invention in the post purge mode, mode 9B.

By way of example, if no call for heat exists, then BIC 10 is in an "Idle" mode, mode 0 as illustrated in FIG. 8. When a call for heat condition occurs, BIC 10 selects a first evaluation mode within an ordered succession of evaluation modes. In the preferred form, the first evaluation mode is the Water Flow Evaluation, mode 1 as illustrated in FIG. 9a. The water flow evaluation mode may result in BIC 10 returning to the Idle mode if a call for heat no longer exists, or initiating a next evaluation mode, i.e., the Gas Pressure Evaluation, mode 2 as illustrated in the FIG. 10a. In the event that water flow is not proven in mode 1, then a water flow failure mode, mode 1A as shown in FIG. 9b is initiated. Mode 1A provides for a predetermined number of cycles, e.g., 5 cycles or 5 seconds. If water flow is not satisfactorily proven in this time, then a water flow test routine is initiated which results in water flow failure shutdown of the boiler. An understanding of the other modes may be had by reference to the appropriate flowcharts.

A particular embodiment of BIC 10 has been described and many variations are possible. By way of example, and not by way of limitation, BIC 10 is useful with boilers that employ a greater number or a lesser number of boiler safety switches, boilers that do not have a variable firing rate and boilers that are not condensing type boilers and therefore do not use the system bypass valve.

Although the BIC has adequate evidence for mode changes, it is not to be depended on for any flame safety control functions. However, the information that the BIC has will be highly useful information for performance evaluation and troubleshooting of boiler systems.

In the event of a boiler failure the use of BIC 10 will permit a boiler service person to quickly diagnose many problems. Using only typical portable testing devices, e.g. a volt-ohm-meter, a service person can determine at what point in the boiler operating sequence a problem exists. In addition, more sophisticated diagnostic tools such as a laptop or handheld device may be used to query nodes and perform other diagnostic tests. That is, through the monitoring of the modes, or outputs, or alarms of BIC 10, the service person can easily isolate the problem and take action to correct the problem and restore boiler operation.

The operation of BIC 10 has been explained by describing its application to a boiler for a heating system. BIC 10 is also very useful in the control of water heaters. Certain features of BIC 10, for example the reset of the water temperature setpoint as a function of the outdoor air temperature would not be used in the water heater application.

Figure 3:
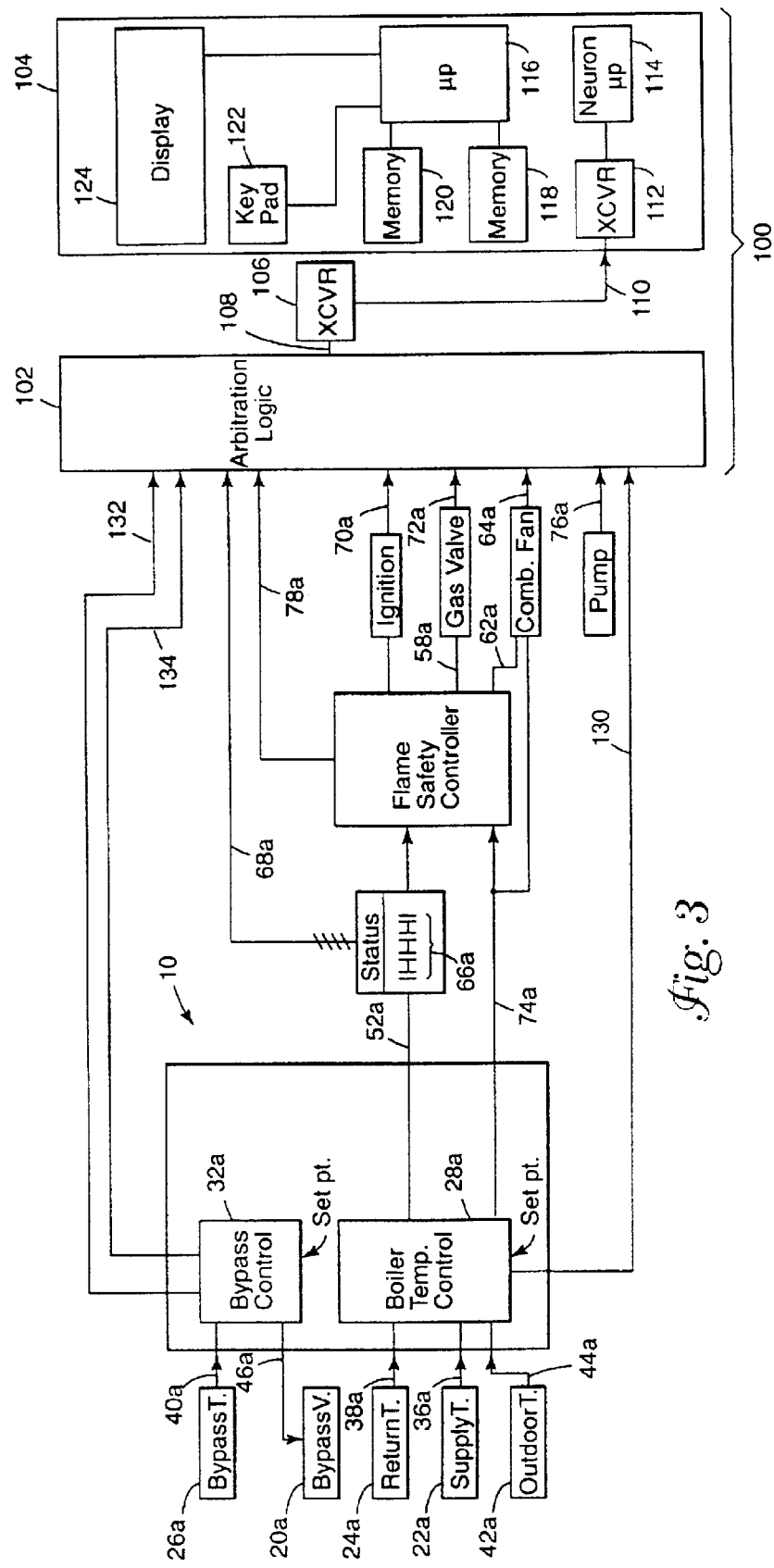
FIG. 3 is a functional block diagram of a Human Interface Panel (HIP) for use with one BIC according to the principles of the HIP invention.

A human interface panel (HIP) for use with BIC 10 is shown in the figures and generally designated 100. HIP 100 will be explained by reference to its use with BIC 10, but it is to be understood that the principles will be useful with any boiler system that is arranged to take advantage of the features of the HIP of the present invention. HIP 100 in a single boiler configuration with BIC 10 is illustrated in FIG. 3. Where inputs to BIC 10 from sensors are designated with a reference numeral and a letter, e.g., return water temperature 24a indicating that a sensor for the same purpose was described with regard to FIG. 2. Temperature control module 28a receives signal 36a from sensor 22a located in the boiler supply water, signal 38a from sensor 24a located in the boiler return water, and signal 44a from sensor 42a located in outdoor air. BIC 10 also provides for receiving a setpoint signal related to a desired control setpoint signal. Bypass temperature control module 32a receives signal 40a from bypass temperature sensor 26a and provides signal 46a to bypass valve 20a.

HIP 100 in the preferred form includes arbitration logic module 102 having a number of status inputs that will be further explained, transceiver 106 and a command display device (CDD) 104. According to the principles of the HIP invention, arbitration logic module 102 receives status inputs from BIC 10 and other status devices including boiler safety switch status 68a, ignition device status signal 70a, gas valve status signal 72a, combustion/purge fan status 64a, pump status 76a, flame safety controller status signal 78a, temperature control status 130, bypass status 132, and bypass resynch status 134. For simplicity, only representative inputs to arbitration logic 102 have been shown in FIG. 3. In operation, the arbitration logic is implemented by reading all inputs to arbitration logic module 102 including the following: request for heat, sys disable, sys init, emergency, factory test, high temp, freeze protect, hvac emerg, hvac off, water flow safety, gas pressure safety, high/low gas pressure safety, low air pressure safety, block drain safety, pre-purge, ignition ON, gas valve ON, flame fail, post-purge, sequencer, fire low, fire mid, fire hi, number of stages, total stages, staged firing rate, min firing timer.

After reading all inputs, arbitration logic 102 then processes the readings according to the structure shown in the flow chart of FIG. 20. Arbitration logic module 102 provides output 108 to transceiver 106 which provides signal 110 to CDD 104. Arbitration logic module 102 and transceiver 106 are located at the boiler and may be in the same enclosure as BIC 10 while CDD 104 may be located at a distance from the boiler. CDD 104 in the preferred form includes an Echelon transceiver 112, Echelon Neuron 3120 processor 114, microprocessor 116, configuration memory 118, memory 120, keypad 122 and LCD screen display 124. Neuron processor 114 periodically, e.g., once per sec, requests the status of a specific status variable using the address and identification of the device and status variable. Arbitration logic module 102 responds with arbitration encoded signal 110 which is received thru transducer 112 and stored in a communications buffer in Neuron processor 114. Microprocessor 116 processes and decodes the message to user friendly text and buffers and displays the message on display 124.

Permanent configuration information on identification structure and address of information is stored permanently in electrically erasable memory or flash memory 120. Keypad 122 is used to select information for display and to move to different displays, e.g. from the status of individual boilers within a group of boilers to individual status values within a specific boiler.

The HIP of the present invention is a single status variable that can display the current status of an individual boiler or a system that includes a group of boilers. The display includes status information such as single stage firing status, multiple stage firing status, safety conditions, pre-purge, post purge, unknown safety, ignition evaluation, and post purge preparation. In addition the HIP provides monitoring of flame safety controller status, and active management of non-flame-safety mode changes in a real time temperature control environment. The HIP invention in the specific embodiment shown utilizes the Status_Mode display variable. This technique consolidates critical system functions and error information in one efficient variable structure using the LonWorks protocol to transfer information from the boiler devices. This data structure can be transferred to a low cost peer to peer device through the Echelon bus. Information on the use of the Lonworks System is available from the Echelon Corporation, 4015 Miranda Avenue, Palo Alto, Calif. 94304, USA. While certain specific embodiments of the present invention are described with reference to the LonWorks System, it is not intended that the invention be so limited. Other processors and communication protocols could be used.

Figure 4:
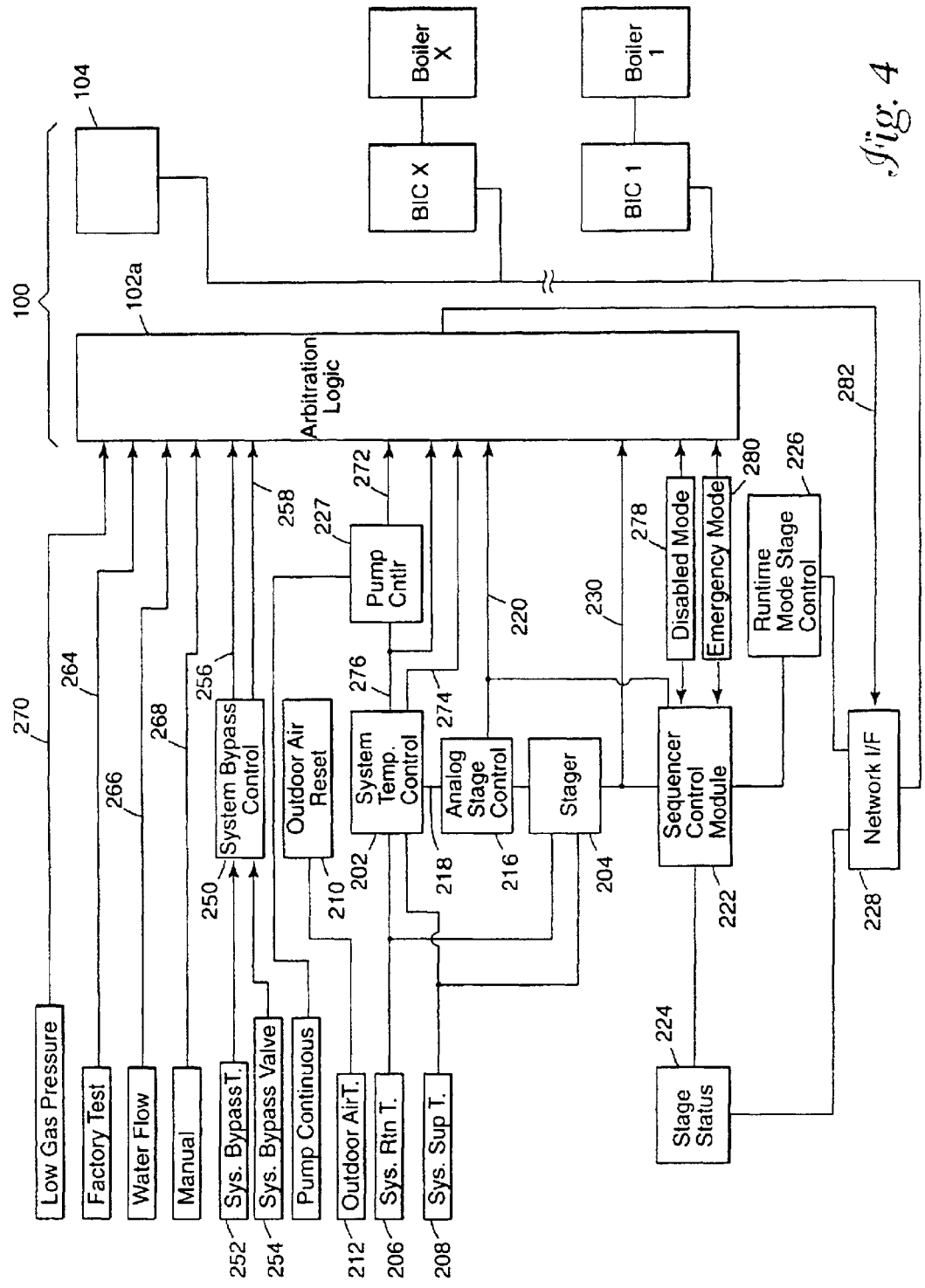
FIG. 4 is a functional block diagram of a Human Interface Panel for use with a Sequencer according to the principles of the HIP invention.

The use of the HIP with a single boiler has been described. In addition, the HIP may be used in a multiple boiler system where a number of individual boilers are installed with the pumping and water piping arranged to provide for common system return water temperature, common system supply temperature and common system bypass temperature. The use of HIP 100 in a multiple boiler embodiment is illustrated in FIG. 4 where BIC 1 interfaces to Boiler 1 and BIC X interfaces to Boiler X. The use of HIP 100 with multiple boilers includes the use a sequencing controller 200, the operation of which is more completely described herein.

In the multiple boiler embodiment BIC 10 is configured with modules as shown in FIG. 4 including system temperature control module 202, outdoor air reset module 210, analog stage control module 216, stager module 204, sequencer control module 222, stage status module 224, runtime mode stage control module 226, pump controller 227, system bypass control module 250 and network interface 228. In operation, temperature control module 202 and stager module 204 both receive system return water temperature from sensor 206 and system supply temperature from sensor 208. Outdoor air reset module 210 receives outdoor air temperature from sensor 212 and provides a reset setpoint to system temperature control module 202. System temperature control module 202 provides request for heat signal 276 to pump controller 227 and, to arbitration logic module 102a as well as freeze protection signal 274 to arbitration logic module 102a. Analog stage control module 216 receives temperature control information signal 218 from and provides system firing rate signal 220 to sequencer control module 222 and to arbitration logic module 102a. Stager module 204 provides a requested number of stages signal 238 to sequencer control module 222 and to arbitration logic module 102a based on a rate of change of the temperature difference between the supply temperature 208 and return temperature 206 and other variables. Stage status module 224 receives information from BIC 1 and BIC X. System bypass control module 250 receives a system bypass temperature from sensor 252 and provides bypass status 256 and system resynch status 258. Multiple boiler arbitration logic module 102a has a number of additional inputs including system factory test 264, system waterflow 266, manual 268, low gas pressure 270, pump status 272, freeze protection 274, disabled mode 278 and emergency mode 280. For simplicity, only representative inputs are shown. Arbitration logic module 102a responds through a network interface module (not shown) with arbitration encoded signal 282 which is received by network interface module 228 and provided to CCD 104. The functioning of CCD 104 in the multiple boiler implementation is as described under the HIP 100 description for the single boiler embodiment and includes the ability to display status information from a multiple boiler system as well as individual boilers within the multiple boiler system.

The single status variable from the Temperature controller allows the monitor boiler system status displayed in a hard real time, state machine task environment that will not require uninterrupted and sequential access to conditions.

In the preferred form, unique status modes are displayed as shown in Table 1. The term status mode or application mode may be used interchangeably. The meaning of the individual status modes will be apparent from the Enum-Type.

TABLE 1

| DataType bice.txt | EnumType | EnumValue |
|---|---|---|
| STATUS_MODE | START_UP_WAIT | 0 |
| STATUS_MODE | IDLE | 1 |
| STATUS_MODE | WATER_FLOW_EVAL | 2 |
| STATUS_MODE | AIR_PRES_EVAL | 3 |
| STATUS_MODE | BLOCK_DRAIN_EVAL | 4 |
| STATUS_MODE | LOW_GAS_PRESS_EVAL | 5 |
| STATUS_MODE | PRE_PURGE | 6 |
| STATUS_MODE | IGNITION_EVAL | 7 |
| STATUS_MODE | BOILER_ON_EVAL | 8 |
| STATUS_MODE | HEAT | 9 |
| STATUS_MODE | WATER_FLOW_FAIL_MODE | 10 |
| STATUS_MODE | AIR_PRESS_FAIL_MODE | 11 |
| STATUS_MODE | BLOCK_DRAIN_FAIL_MODE | 12 |
| STATUS_MODE | BLOCK_FLUE_FAIL_MODE | 13 |
| STATUS_MODE | LOW_GAS_PRESS_FAIL_MODE | 14 |
| STATUS_MODE | FLAME_FAILURE_MODE | 15 |
| STATUS_MODE | SOFT_LOCK_OUT_FAIL_MODE | 16 |
| STATUS_MODE | HEAT_MOD_FAIL_MODE | 17 |
| STATUS_MODE | MANUAL | 18 |
| STATUS_MODE | FACTORY_TEST | 19 |
| STATUS_MODE | PUMP_ONLY | 20 |
| STATUS_MODE | EMERGENCY_MODE | 21 |
| STATUS_MODE | DISABLED_MODE | 22 |
| STATUS_MODE | HIGH_TEMP_MODE | 23 |
| STATUS_MODE | OFF_MODE | 24 |
| STATUS_MODE | SMOKE_EMERGENCY | 25 |
| STATUS_MODE | POST_PURGE | 26 |
| STATUS_MODE | FREEZE_PROTECT_MODE | 27 |
| STATUS_MODE | POST_PURGE_PREPARE | 28 |
| STATUS_MODE | FLOAT_OUT_SYNC | 29 |
| STATUS_MODE | IDLE_MIN_DELAY | 30 |
| STATUS_MODE | SPARE_MODE2 | 31 |
| STATUS_MODE | SEQ_HEAT_0STGS | 32 |
| STATUS_MODE | SEQ_HEAT_1STGS | 33 |
| STATUS_MODE | SEQ_HEAT_2STGS | 34 |
| STATUS_MODE | SEQ_HEAT_3STGS | 35 |
| STATUS_MODE | SEQ_HEAT_4STGS | 36 |
| STATUS_MODE | SEQ_HEAT_5STGS | 37 |
| STATUS_MODE | SEQ_HEAT_6STGS | 38 |
| STATUS_MODE | SEQ_HEAT_7STGS | 39 |
| STATUS_MODE | SEQ_HEAT_8STGS | 40 |
| STATUS_MODE | SEQ_HEAT_9STGS | 41 |
| STATUS_MODE | SEQ_HEAT_10STGS | 42 |
| STATUS_MODE | SEQ_HEAT_11STGS | 43 |
| STATUS_MODE | SEQ_HEAT_12STGS | 44 |
| STATUS_MODE | SEQ_HEAT_13STGS | 45 |
| STATUS_MODE | SEQ_HEAT_14STGS | 46 |
| STATUS_MODE | SEQ_HEAT_15STGS | 47 |
| STATUS_MODE | SEQ_HEAT_16STGS | 48 |
| STATUS_MODE | HEAT_Low | 49 |
| STATUS_MODE | HEAT_MEDIUM | 50 |
| STATUS_MODE | HEAT_HIGH | 51 |

The HIP boiler status display variable structure is shown in Table 2.

TABLE 2

| Field Name | Example Data (Range) | Field Length | Data Type | Field Description |
|---|---|---|---|---|
| NvoBoilerStatus Share: Polled From Boiler to HIP or monitoring node | ApplicMode HEAT (See table 1 for list of Enumerations) | 1 byte | ENUMERATION (BYTE) of type STATUS_MODE | Current Application Mode of to be commanded to the boiler - See Table 1 for possible values |
| | Additional fields | ... | ... | ... | ... |
| | Additional fields | ... | ... | ... | ... |

The HIP provides access to all control boiler functionality such as mode progression monitoring, pre-purge speed, pre-ignition speed control, Heat evaluation mode, and post purge ignition shutdown capabilities from the temperature control BIC. By proper boiler system design, all mode monitoring and transitions present in the BIC can be implemented without interfering with the flame-safety controller's safety requirements. In addition, the BIC provide temperature control of multiple stages of a high efficiency condensing, automatic bypass control, modulating firing rate boiler at both the individual modular boiler level and system sequencing level.

Now that the operation of HIP 100 has been set forth, many advantages can be further set forth and appreciated:

Safety and Health Factor: Hot Water boilers, gas boilers, high-pressure steam, and boiler devices are prone to very critical safety issues. Traditionally these safety issues are solved through extremely stringent regulations on boiler manufacturers concerning "flame safety" devices and rigid safety mode analysis. One area that has not been exploited is to use the non-flame safety status of the boiler and display this information to the user in an intelligent combination that provides safety diagnostic information, and allows monitoring of the boilers for characteristics of unsafe conditions (such as flame fail or repeated attempts at ignition) that will allow tracking of problems before they start. By making the status of the boiler modes and safety conditions readily available, safety is improved and the chance of injury due to boiler explosion is reduced. Safety and Health benefits are accrued though addition system incorporation into the HIP display.

Cost: By using, in the preferred mode, the UNVT_Status_Mode display variable to transfer information from the boiler devices, significant cost reductions of interface can be achieved and realized by consolidation of critical system functions and error information in one very efficient variable structure. This data structure can be transferred to a low cost peer to peer device through the Echelon bus, which provides for interoperability, interoperability standards, cross-industry support, and low cost interface. By using fewer relays to interface the information to traditionally expensive automation panels, and through the use of low cost displays, multiple display locations of boiler status results are possible.

Ease of use: no Boiler operation knowledge is necessary, as all information is available "at a glance" from HIP main view screen. This ergonomically pleasing display is easy and compelling for the user to interact with and can easily be used to evaluate complete boiler system status.

Ease of production: Due to the significantly reduced complexity of the display and general-purpose interface of the display, the end device could be produced very inexpensively. Multiple HIP devices could be added to the system as both a local and remote display. Subsets of Boiler Data and System Data could be displayed from the local device or at a remote location such as the System engineers office, or the Church Custodians or Fast Food Restaurant Managers office.

Durability: Since there is no remote relay connections and wiring, the traditionally expensive and complex remote status display is now very cost effective, and is supported by true $3^{rd}$ party interoperability with a ubiquitous and commodity interface. Without the wide variety of wiring and remote connections, the design is much more durable than previous Interoperability—Since the boiler system preferred implementation is performed on the Echelon LonWorks System, multi-vendor support, internet communication, cell phone access, and remote diagnostics, trending, database analysis, and support can be afforded through $3^{rd}$ party solutions. By utilizing a non-flame safety device, the communications interface is removed from the failure recovery and acknowledgment mechanisms inherent in the protocol used for flame safety devices.

Convenience/Repair—by being aware of the operation and failure modes of the boiler, a repairperson would be able to save a trip or carry the correct part with them before making a service trip to the boiler installation. Careful inspection and monitoring of a boiler transition of the status modes, and observation of the conditions up to the failure can reveal the boiler operation condition with startling accuracy. The Hip and Boiler Interface units themselves are quite simple and lead to quick repair of failed units.

Efficiency: By observing the actual firing status and system operation, conclusions about the operational efficiency and number of stages required to achieve stable control of heat transfer can be observed directly in real time from a remote location. By detailed observation of the boiler status and sequence status selected, an efficiency comparison of operational savings of boiler operation can be observed and documented.

Precision: By observing timely, efficient updates of Boiler Modes and sequencing status, a precise view of the operation of the boiler can be achieve without requiring a separate trip to the boiler room.

Enhancements: Related products can add new features that depend on the mode behavior such as state monitors, dial in tools to bus, and combinations product that would combine for instance VFD efficiency and air/fuel ratio tuning.

Although a separate state controller and flame safety control mechanism is presumed to already exist in the boiler flame safety controller, the best location for the logic is in the BIC temperature controller and sequencer, where access to open system communications, sequencing controls, temperature control, and programming schedule information resides. The BIC implementation allows for all of the invention's features described above.

Figure 5:
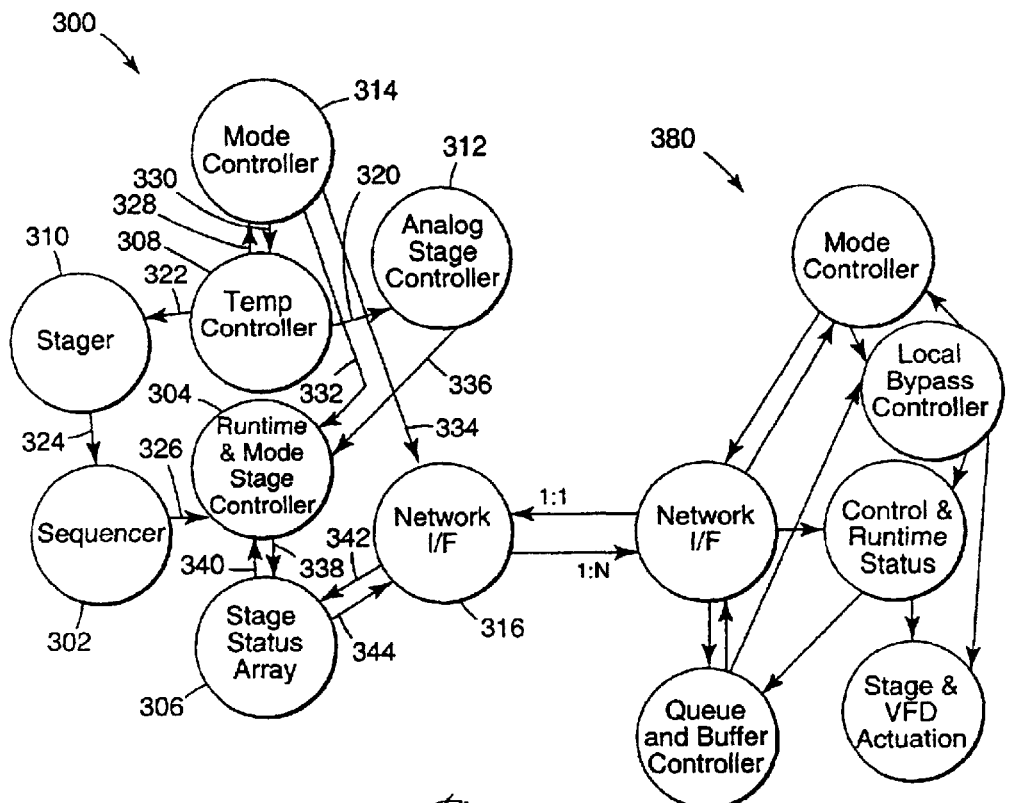
FIG. 5 is a contextual software drawing of the Sequencer and modular boiler system of FIG. 4.

Boiler systems that utilize a number of modular boilers require a control system that provides for the sequencing of the modular boilers. Certain aspects of fault tolerant multi-node stage sequencing controller 200 were partially explained in relation to arbitration logic module 102a in the explanation of the use of HIP 100 with multiple boilers. The operation of sequencing controller 200 may be represented as illustrated in FIG. 5 including a Sequencer Node 300 and a stage node 380. Sequencer node 300 is a temperature control device that monitors the system control temperatures and makes decisions to actively manage multiple-stage node analog control level and on/off stage decisions changes such as and adding and removing functioning stages. Sequencer node 300 includes sequencer 302, Runtime & Mode Stage Controller 304, Stage Status Array 306, temperature controller 308, stager 310, analog stage control 312, mode controller 314, and Network Interface 316. In operation, temperature controller 308 provides firing rate temperature demand signal 320 to analog stage controller 312 and stage temperature demand signal 322 to stager 310. Sequencer module 302 receives number of stages required signal 324 from stager 310 and provides sequencing information signal 326 to runtime and Mode stage controller 304. Mode controller 314 receives temperature control status signal 328 and provides mode status signal 330. Mode controller 314 provides mode status signal 332 to runtime and mode stage controller 304 and mode signal 334 to network interface 316. Analog stage controller 312 provides firing rate system signal and status signal 336 to runtime mode stage controller 304. Stage status array 306 receives stage number and firing rate signals 338 from runtime and mode stage controller 304 and provides stage status signal 340 to controller 304. Stage status array 306 receives boiler identification (ID), mode and run time information signal 342 from interface controller 316 and provides communications formatted signal 344 to controller 316.

Stage Node 330 is an active communications and control node that interfaces to an active energy source. In the context of boiler systems, stage node 330 may be a boiler interface controller such as BIC 10 that interfaces to a flame safety controller 30 and to various sensors, boiler safeties and status signals as previously described herein. Stage node 330 implements decisions made in sequencer node 300 algorithms for control relating to analog firing rate and the addition or deletion of a stage. Information on runtime, control status, and safeties is communicated back to Sequencer Node 300.

The present invention is a multi-node sequencing controller (based on stage runtime), which uses the runtime and node stage controller piece to process unique data-collecting information stored in the stage data array. Though the use of the decision technique implemented in the runtime and mode stage controller, operations and total runtime hours from the modular stages are reflected in decisions to request control actions for the modular heat units in the system. This allows dynamic load balancing as problems affect single and multiple modular heating nodes.

Sequencing controller 200 provides a method to control dynamic loading and staging of boiler stage node functionality such as mode progression monitoring, pre-purge speed, pre-ignition speed control, Heat evaluation mode, and post purge ignition shutdown capabilities. By proper boiler system design, all mode monitoring and transitions present in the stage node can be implemented without interfering with the sequencer nodes staging requests. In addition, if any errors or faults occur in stage node 380, then sequencer node 300 can dynamically adjust the control of the remaining multiple stages individually of a high efficiency condensing, automatic bypass control, modulating firing rate boiler by taking into account the failed status and readjusting the load dynamically independent of the source control algorithm.

Figure 6:
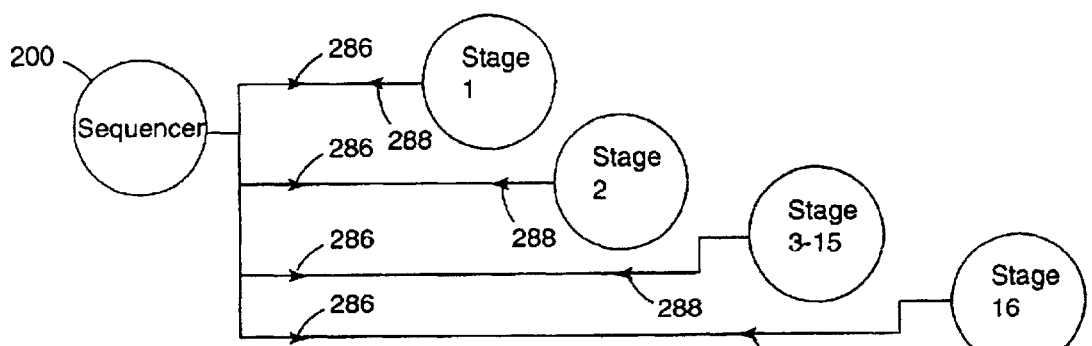
FIG. 6 is an illustration of certain details of the Sequencer of FIGS. 4 and 5.

Referring to FIG. 6, periodically sequencer 200 broadcasts a nvoSeqShare message 286 globally to all the nodes, however each nvoSeqShare message is intended for a specific node address and the message contains this specific node address. Similarly all stage nodes broadcast their nvoModBoilerShare message 288 back to sequencer 200 where the message is decoded. Sequencer node 300 uses an efficient array to collect and rank boiler interface controllers based on the runtime and mode stage controller. A more complete understanding of the Sequencer invention may be obtained from Pseudocode included as an Appendix and the following information regarding data structure herein.

Data structure 1, Stage Array [0 to 16] in Sequencer

| | Values | |
|---|---|---|
| Percent heat stage | 0 to 100% | Actual Heat % from stage |
| Heat stage runtime | 0 to 65534 hrs. | Number of hours from stage |
| Heat stage add rank | 0 to 16 | See note 1 |
| Heat stage del rank | 0 to 16 | See note 1 |

Note 1
| Heat stage combination | Resultant Action |
|---|---|
| add rank = !0, del rank = 0 | Off Stage !0 means not 0 |
| add rank = 0, del rank = !0 | On Stage !0 means not 0 |
| add rank = 0, del rank = 0 | Stage disabled, Invalid or Offline |
| add rank = !0, del rank = !0 | Invalid, will be reset to add rank = 0 and del rank = 0 |

Data structure 2 and data structure 3 are shown in tables 3 and 4 respectively.

TABLE 3

| Field Name | Example Data (Range) | Field Length | Data Type | Field Description |
|---|---|---|---|---|
| nvoSeqShare: From Sequencer to | ShareTempHeat Cmd | 45% (0 to 100%) | 2 bytes | SIGNED LONG | Share Temperature Heat Command - Output |

TABLE 3-continued

| Field Name | | Example Data (Range) | Field Length | Data Type | Field Description |
|---|---|---|---|---|---|
| Modular Boiler Nodes (nviSeqShare) | | | | | Command of heat to modular boiler |
| | ModularBlrID | 3 | 1 bytes | UNSIGNED INTEGER | ID# of Mod boiler for which this command is intended |
| | ApplicMode | HEAT = 9 (See table 1 for list of Enumerations) | 1 byte | ENUMERATION (BYTE) of type STATUS_MODE | Current Application Mode to be commanded to the boiler - See Table 1 for possible values |
| | Stage Enable | ON = 1 | 1 byte | UNSIGNED INT | Stage Enable/disable command to be commanded to the boiler |

TABLE 4

| Field Name | | Example Data (Range) | Field Length | Data Type | Field Description |
|---|---|---|---|---|---|
| NvoModBoiler-Share: From Modular Boiler to Sequencer (nviModBoiler share) | BoilerMode | HEAT (See table 1 for list of Enumerations) | 1 byte | ENUMERATION (BYTE) of type STATUS_MODE | Current Application Mode of modular boiler. See Table 1 for possible values |
| | Stage Enable | ON, 100% | 2 byte | SNVT_SWITCH | Stage Enable/disable command to be commanded to the boiler |
| | ModularBlrID | 3 | 1 bytes | UNSIGNED INTEGER | ID# of Mod boiler for which this command is intended |
| | ModBlrAlarm | ON | 1 byte | ENUMERATION (BYTE) | Current Alarm Mode of the modular boiler. Enumeration to be defined customer for boiler application |
| | BoilLoad | 45% (0 to 100%) | 2 bytes | SIGNED LONG | Actual Mod Boiler firing rate - |
| | BoilerRunTimeHr | 250 hrs (0 to 65535 hrs) | 2 bytes | UNSIGNED LONG | Number of hours that this modular boiler stage has run. |

The pseudocode contained in the Appendix illustrates a sequence referred to as Efficiency Optimized with Runtime. This Sequence provides a technique for adding capacity by turning on a boiler having the lowest runtime and reducing capacity by turning off a boiler having the highest runtime. It will be apparent that using the principles of the present invention, variations or options may be implemented. For example one option could employ a first on/first off sequence as capacity is reduced. Another option could employ operating boilers at a capacity that is most efficient. For example, if the highest efficiency occurs at minimum loading, then this option would add a boiler when the load is such that the added boiler can run at minimum capacity. For example, if boiler number 1 reaches a 60% load, then boiler number 2 could be added such that both boilers can operate at 30% loading. Other variations will be apparent to those of ordinary skill in the art.

This invention has applications to analog staged energy systems with fault tolerant and transparent dynamic load distribution based on stage status and runtime.

While Sequencer 200 has been described in terms of its application to a boiler control system or hot water system it is not limited to these uses. Sequencer 200 may be used to stage other energy systems, for example water chillers or electric generators.

Figure 19:
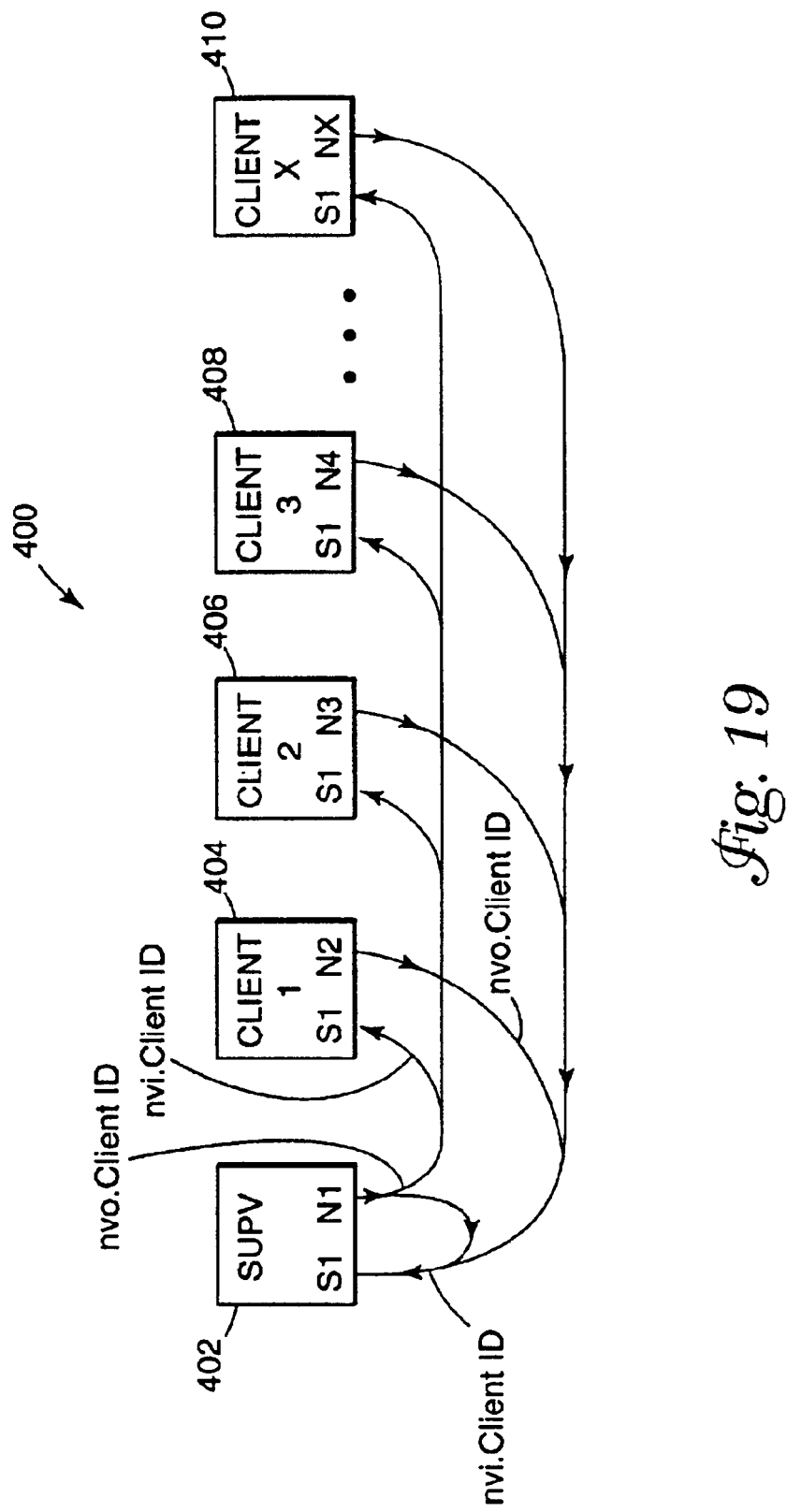
FIG. 19 is a functional block diagram of a network which provides automatic self-configuration of controllers acting as nodes on a network according to the principles of that invention.
Figure 20A:
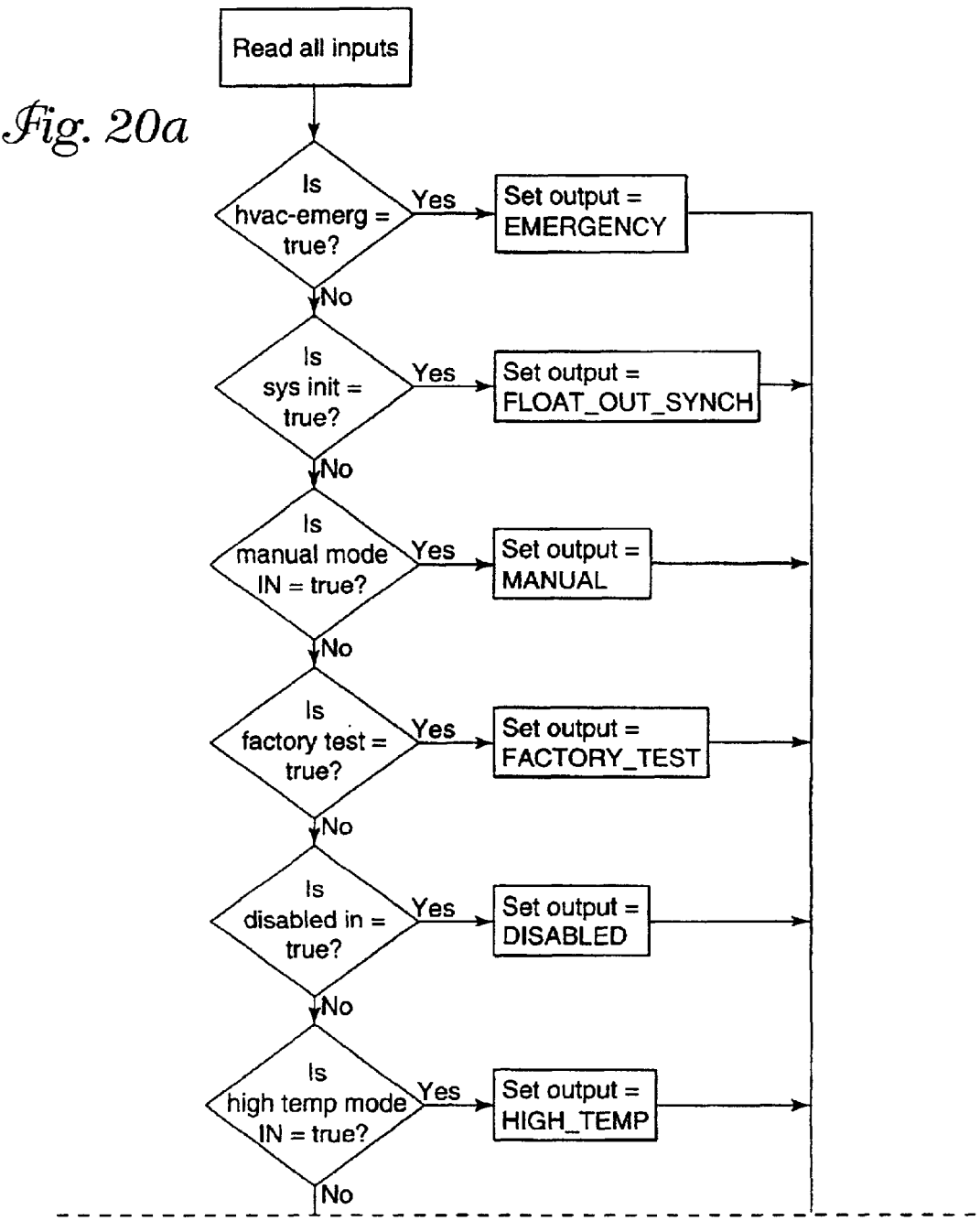
FIGS. 20a through 20d are flowcharts illustrating a portion of the operation of the HIP invention of FIGS. 3 and 4.
Figure 20B:
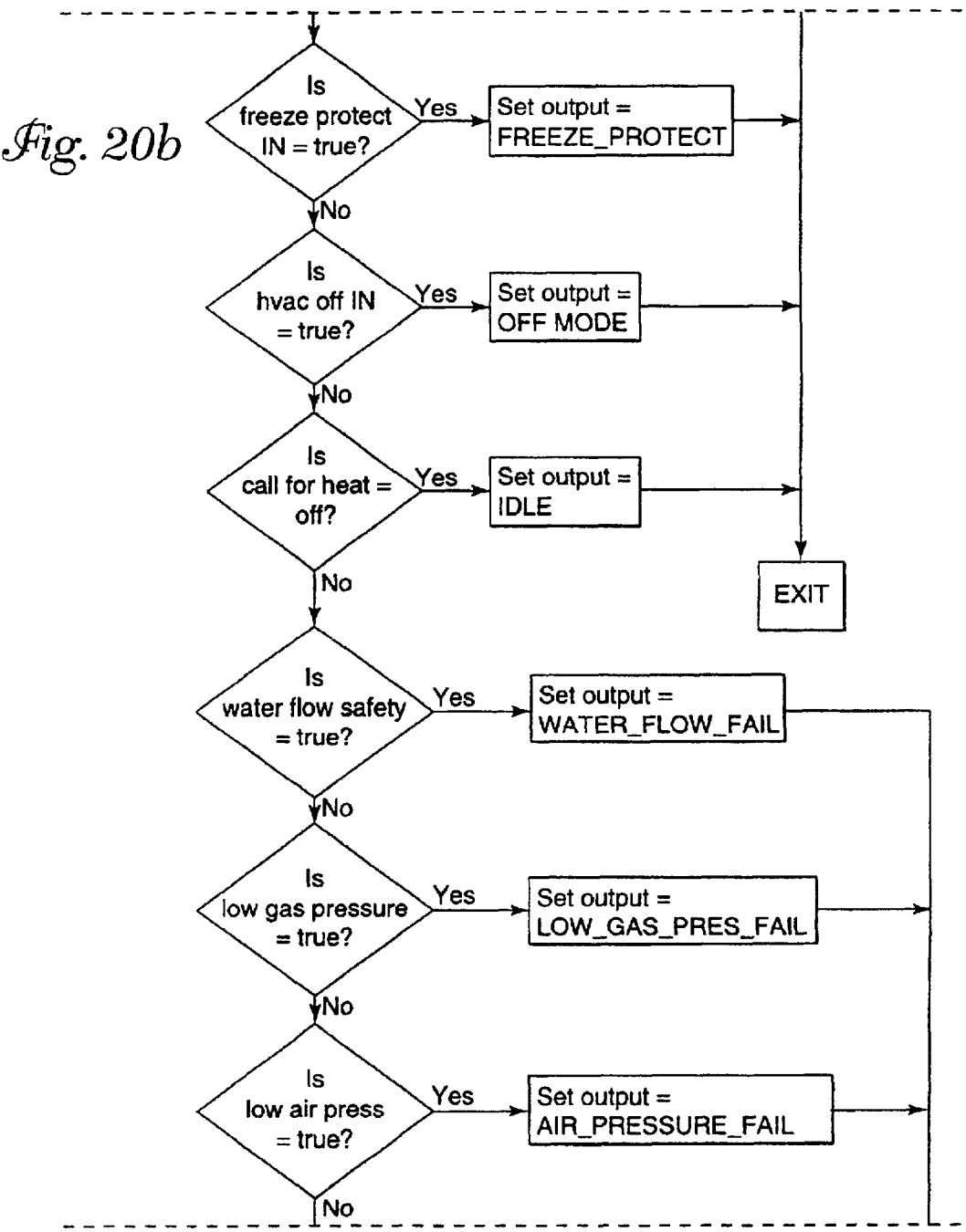
Figure 20C:
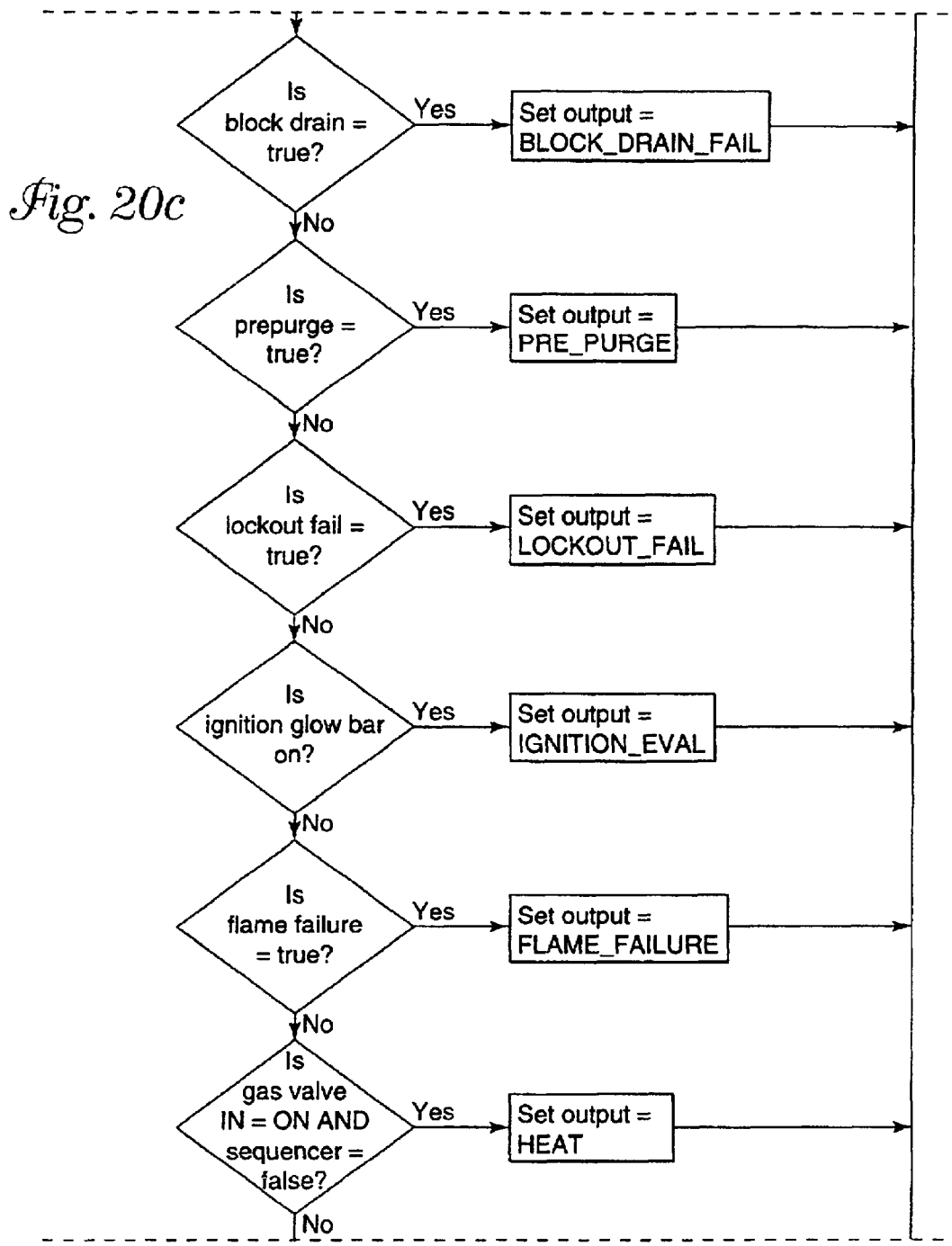
Figure 20D:
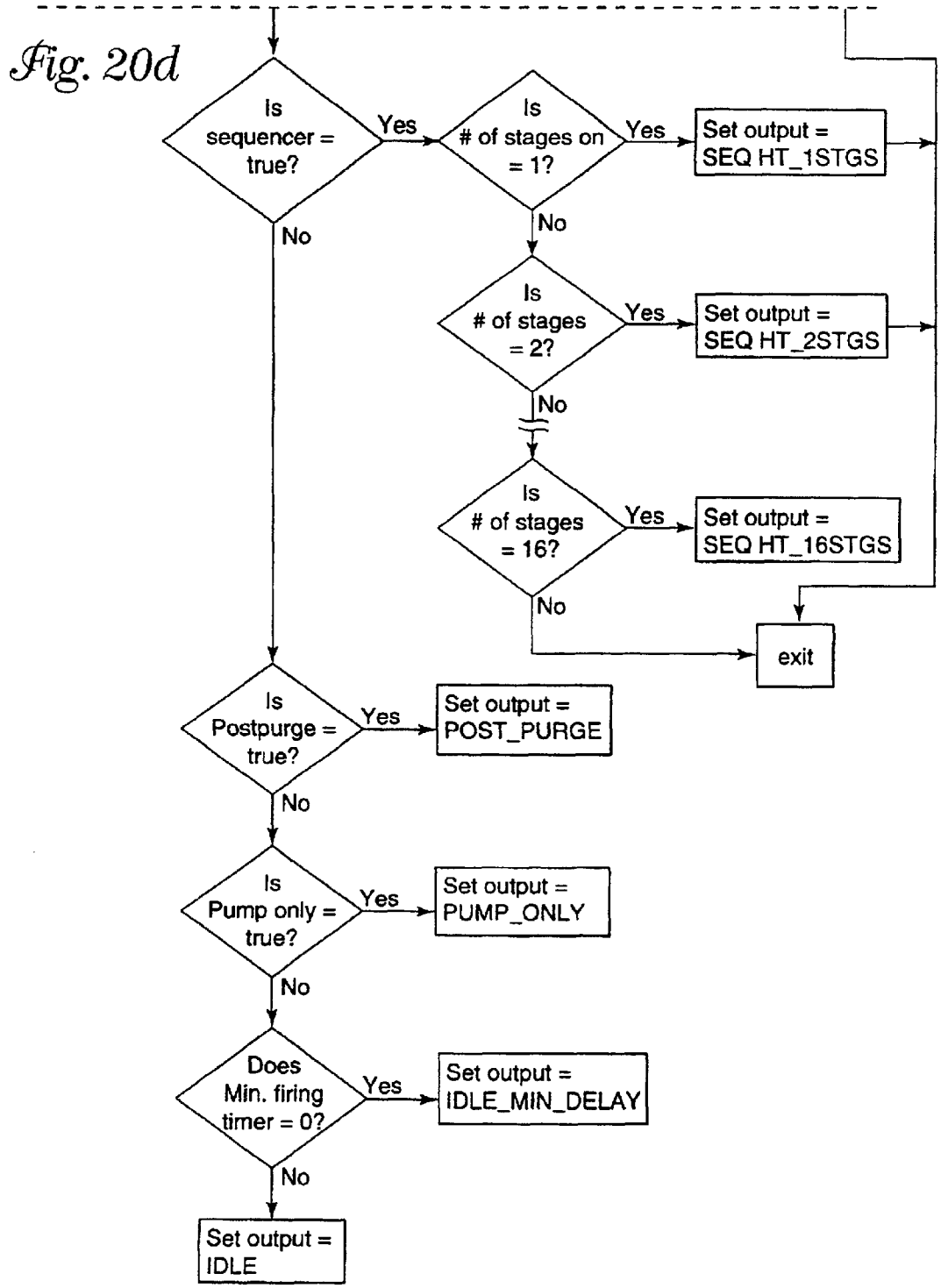

The self-configuration invention, an automatic self-configuration technique, will now be described. This technique acts in place of a network configuration tool such that it provides status and information to be transferred from client nodes back to a designated supervisory node so that proper operation can take place without the use of a configuration tool. This technique represents substantial value as a self-configuration technique for automatic node addressing and self-configuration for multi-node Supervisory/Client control systems. Referring to FIG. 19, a diagram illustrating self configuration technique 400 is shown including a supervisory node 402, client node 404, client node 406, client node 408 and client node 410. Additional details of the self-configuration invention are provided in Table 5. In general nvoClientID could replace the functionality of nvoSupvShare and assign the client nodes to a client ID.

TABLE 5

| Network Variable | Field Description | Example Data | Field Length | Data Type |
|---|---|---|---|---|
| nvoSupvShare: from Supervisor Controller to Client Nodes (assigns client nodes to a client ID) | NID field [6] | 00 01 5D 4F 11 26 | 6 bytes | HEX |
| | ui Client Cmd S4 | 45% | 2 bytes | UNSIGNED |
| | Client ID | 3 | 1 byte | UNSIGNED |
| | applic Mode | HEAT | 1 byte | ENUM of type STATUS_MODE |
| | Effective Occ | Occ | 1 byte | SNVT_OCCUPANCY |
| | Node Enable | ON | 1 byte | ENUM |
| nvoClientShare: from Client to Supervisor Controller | Client Mode | HEAT | 1 byte | ENUM of type STATUS_MODE |
| | Node Enable | ON | 1 byte | ENUM |
| | Client ID | 3 | 1 byte | UNSIGNED |
| | Effective Occ | Occ | 1 byte | SNVT_OCCUPANCY |
| | ALARM | ON | 1 byte | ENUM |
| | ui Client Load S4 | 44% | 2 bytes | UNSIGNED |
| nvoClientID: periodically broadcast from Client to Supervisor (broadcast client's neuron ID for collection by supervisor) | NID field [6] | 00 01 5D 4F 11 26 | 6 bytes | HEX (OWN NID) |
| | Client ID | 3 | 1 byte | UNSIGNED |
| | | 1 to FE | | Client ID from Client to Supervisor sending from Supervisor (optional Ø to FE) to Client |
| | | Ø→ | | |

This invention resides in the Node firmware portion of the control system and provides for binding of a minimally configured supervisory/client control node system.

Supervisory Node/Client Node Binding & Configuration Procedure

1. The firmware in the client nodes is the same as the firmware in the supervisory node.
2. Initially all nodes are pre-configured identically at the factory default values.
3. Initially nvoSupvShare of all nodes are bound to nviSupvShare of all nodes in a group, and nvoClientID of all nodes is bound to nviClientID of all nodes in a group
4. All nodes have the same domain/subnet/node addresses with the clone_domain-bit set
5. By the use of a digital or analog input, the node with a short (digital) or resistive value set (analog) to a fixed special value at the input, node 402 is identified as the supervisory node. The internal programming of the controller automatically changes the configuration parameter network variable nciConfig. Application Type to Type "Supervisory Node to 16 nodes"—providing nci Config-Src is set to CFG_LOCAL showing that no configuration tool has changed any configuration parameters.
6. Periodically (every 30 seconds) the individual client nodes broadcasts nvoClientID to the supervisory node nviClientID. Other clients also receive nviClientID but ignore nviClientID. NvoClientID contains nviClientID.NIDOut (a 6-character NID string) and the ClientIDOut field which contains the Client ID (0–254) of the client node. Initially all the client Ids are set to 0 (unconfigured).
7. All non-supervisory Nodes discard the nviClientID information, but the Supervisory stores the nvoClientID information into and array and sorts them by NID (Neuron ID). For example:

Sequence Array [0].NID=00 OF 30 FF 1C 00 Sequence Array [0] .rank=1
Sequence Array [1].NID=00 OF 31 FF 1C 00 Sequence Array [1] .rank=3
Sequence Array [2].NID=00 OF 31 FF 1F 00 Sequence Array [2] .rank=2
Sequence Array [3].NID=00 FF 31 FF 1F 00 Sequence Array [3] .rank=4

8. Supervisory node 402 periodically broadcasts nvoSupvShare to nviSupvShare of all nodes. nvoSupvShare contains a field to identify the NID and its ClientID (the index of the array). The supervisory node receives nviSupvShare but ignores nviSupvShare. Client nodes respond to the nvoSupvShare broadcast if the NID matches their own Neuron ID (set in by the manufacturer of the neuron integrated circuit). 9. At the client node, if the NID matches its own node, the new ClientID will be updated to match the new ClientID assigned to it. This involves changing the Subnet/Node assignment also so that the Subnet is fixed to 1 and the Node is set to the same as the ClientID. From now on, when the client node broadcasts nvoClientID, the ClientID will use the ClientID assigned to it by the supervisory node.
10. Optionally, other feedback and status of the Client node is Broadcast (via nvoClientShare) back to the Supervisory node to give a positive ID status of the client ID, the Client state and the client analog value.

Control systems that utilize a number of client nodes with individual interfaces to the client controllers require a control system that provides for the coordination of the client nodes. Supervisory node 402 and the individual client Controllers 404, 406, 408, and 410 must be configured so that communication can occur between supervisory node 402 and the individual clients.

All nodes in this invention are initially factory-configured as "clone-domain", and Echelon LonWorks attribute indicating a special mode where unique subnet and nodes IDs are not necessary for communication, thus allowing a single configuration to be used to communicate to all other nodes through the same domain.

A single manufactured node type is allowed to be used in both the Supervisor and the individual client node identified as Client 1 to Client 16. Supervisory node 402 is self identified by means of a shorted configuration identification input, and client nodes 404, 406, 408, and 410 are assumed identified by means of the lack of the presence of the shorted configuration identification input. The binding is simply three sets of network variables, called:

nvoClientID and nviClientID
nvoSupvShare and nviSupvShare
nvoClientShare and nviClientShare Individual fields within the network variables are identified in FIG.__

Periodically, Each individual node nvoClientID is broadcast globally to all the nodes. All non-Supervisory nodes discard the message, but the supervisory node uses a predefined array to collect, rank and assign an individual boiler's unique identifier (called NID or Neuron ID). The unconfigured client node will broadcast a client ID of "00". The Supervisory will broadcast a boiler ID of "FF."

Internally, the Supervisory node's client number ranking is now broadcast (via nvoSupvShare) on the clone domain to all the nodes found, including itself. Only the client nodes are programmed to listen to the NID that matches its own node, and subsequently internalize the Client ID and optional analog value commands including mode, analog value, and occupancy status. The process of internalizing the client ID may include internal changes such as updating unique binding and configuration assignments associated with the client node.

Upon reception of the Client ID assignment for the node, the new nvoClientID from the client nodes will broadcast a client ID of "XX," where XX represents the client ID number of that node.

Other feedback from the client node is broadcast (via nvoClientShare or nvoClientID) back to the Supervisory to give positive identification status of the Client ID, the Client State, and analog value.

The self-configuration technique of the present invention has applications to an unknown quantity Supervisory/Client node system to provide self-configured, automatic addressed, multi-stage-modulating control.

Another aspect of the Human Interface Panel 100 of the present invention involves the display of boiler status information on a menu level.

Figure 21:
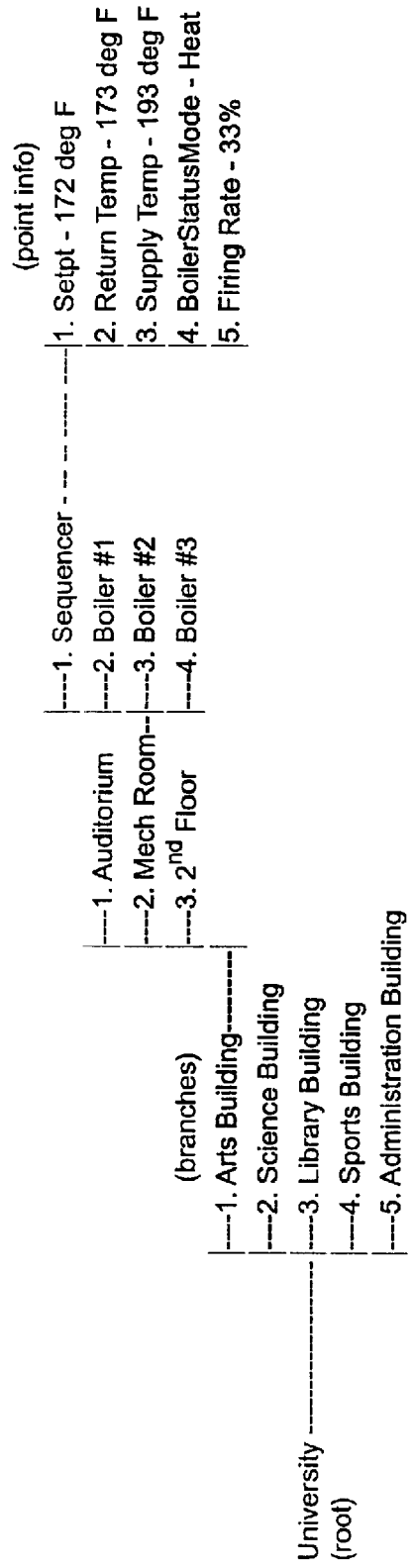
FIG. 21 is an example of a menu for an operator interface according to the prior art.

The traditional method of displaying user point information and grouping structures as shown in FIG. 21 involves navigating a user menu with descriptions. The menus conform to a hierarchical directory structure with a menu structure of organization eventually ending in a selection that reveals point description and values on a multi-line text screen. For an example, a user at a text-based terminal could Select the Mechanical room menu 2 and receive a List of selections including Sequencer, Boiler #1, and Boiler #2. After selecting item 1-Sequencer, the point information for the sequencer, i.e., point information items 1–5, which relate only to the Sequencer would be displayed.

HIP 100 provides for displaying selective controller information in combination with the Menu choice of controller, for example Sequencer, Boiler #1, Boiler #2. The selective information from the controller is combined with the logical controller name information (Sequencer, Boiler #1, and Boiler #2) and results in a "concentration" of information from the associated boiler. To address the need for a low cost display, the point information must be relatively short (small number of characters) and must be able to be displayed in a short space, appropriate for a smaller LCD screen terminal device.

Figure 22:
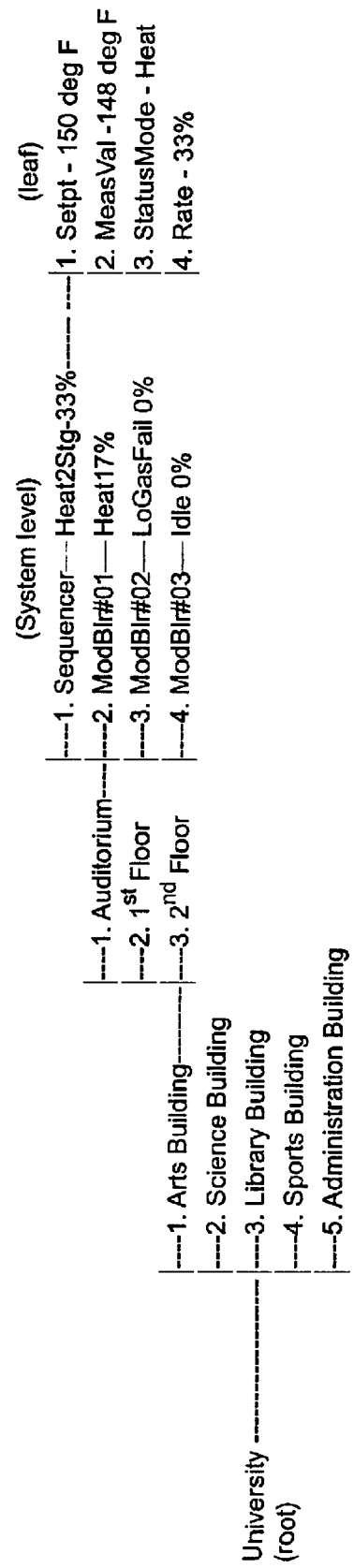
FIG. 22 is an example of a menu according to the principles of the HIP invention of FIGS. 3 and 4.

HIP 100 provides for combining information from a number of controllers. With reference to FIG. 22, where the controller name, Boiler #1 (available from the node variable for Boiler #1 as nciDevicename) is combined with the Boiler Status variable "nvoBoilerStatus.ApplicMode". Optionally, the additional information from nvoFiringRate could be also included in the result.

For example, 2.ModBlr#01—Heat 17% would be an aggregation of 3 parts:

the first part is the Boiler#1 nciDevice name or boiler node name stored in the boiler interface controller which is "ModBlr#01", the second part is the Boiler #1 nvoBoilerStatus.ApplicMode value which is "Heat", and the third part is the Boiler #1 nvoData.firingRate value which is 17%.

The nvBoilerStatus data Structure is shown in Table 6.

TABLE 6

| | Field Name | Example Data (Range) | Field Length | Data Type | Field Description |
|---|---|---|---|---|---|
| NvoBoilerStatus: Polled From Boiler to HIP or monitoring node | ApplicMode | HEAT (See table 1 for list of Enumerations) | 1 byte | ENUMERATION (BYTE) of type STATUS_MODE | Current Application Mode of to be commanded to the boiler - See Table 1 for possible values |
| | Additional fields | ... | ... | ... | ... |
| | Additional fields | ... | ... | ... | ... |

Each choice of the Sequencer, Boiler #1, and Boiler #2 represent point information from different controllers. The Boiler Status display variable is a result of an arbitration of many different operating and failure modes, resulting in an extremely useful and pertinent information status on the boiler. The result of this synthesis of grouping structures and boiler system status information/firing rate in one menu allows dense; information disclosure of 48 arbitrated operating mode and firing rate information on a controller. Enumerations of the Boiler Status Information variable structure are listed in Table 1.

As implemented in HIP 100, the system level menu of FIG. 22 is the primary display associated with the Boiler System.

The meaning of the system level information on a line by line basis may be explained as follows:

Line 1. Sequencer—Heat2Stg-33% - - -

In this example, a Sequencer is sequencing 3 modular boilers. The Sequencer menu displays the Sequencer Status mode in the Heat producing stage, requesting 2 modular boiler for heat with a total system demand of 33% of capacity:

Line 2. ModBlr#01—Heat17%

The sequencer is requesting Boiler #2 to produce heat at 17% of capacity and is functioning normally in the Heat Mode.

Line 3. ModBlr#02—LoGasFail 0%

Modular Boiler #2 is being requested to produce heat by the sequencer, however due to a low gas pressure condition, the boiler is not firing. The firing rate is 0% due to the failure mode. If the HIP operator was knowledgeable about the system firing rate request information, the user could have noticed that the system request is for 33% firing rate, and the first stage is request 17%, leaving 15% load for the $2^{nd}$ stage.

Line 4 ModBlr#03—Idle 0%

The Sequencer is not requesting this stage to produce heat, and this stage is off. It is active and has no problems, so it is in the "idle" mode waiting for a request for heat signal from the sequencer.

The Boiler repair person could view the system level view just described and take additional steps such as the following: verify that the gas supply is available; call the gas company to see if the gas supply to that boiler has been turned off; and perform or view other diagnostic information before traveling to the boiler location.

The information and organization of this rich content menu system for boilers results in reduce troubleshooting time, additional operation information, and reduced cost through fast and proper diagnosis of a boiler system problem.

The method used in HIP 100 for displaying information offers many advantages, some of which have been described. In addition, it provides quick viewing of a boiler node status without the user being overwhelmed with information at the point level. System boiler information is typically viewable on one screen. The method provides for easy navigation at a system level to nodes that require more attention or have problems. Significant diagnostics abilities are provided though monitoring at the "system level" view. By viewing of the data at the system level menu, a system perspective of the performance and problems can be observed without ever taking the time to view the individual point information screens for the sequencer and 3 modular boilers.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than the foregoing description, and all changes which come within the meaning and range of equivalency of the claims are intended to be embraced therein.

APPENDIX

PSEUDOCODE FOR SEQUENCING RUNTIME

```
                                          (Turns on lowest runtime)
                                          (Turns off high runtime)
if (Lead Lag Config. = Efficiency Optimized With Runtime)
  • mark invalid runtimes or    ⎤
  • disabled boilers      or    ⎬ comment
  • invalid combos              ⎦ repeat for Boiler index 1 to MAXSTAGES (typical MAXSTAGE = 16)
    if (Stage [index].Heat Stage Runtime = INVALID)(e.g. 65535)
        ⎡set stage[index].AddRank = 0⎤
        ⎣set stage[index].DelRank = 0⎦
    endif
endrepeat
```

APPENDIX-continued
PSEUDOCODE FOR SEQUENCING RUNTIME

```
repeat for Boiler index 1 to MAXSTAGES
    if (Stage[index].Heat Stage Runtime ! = INVALID)(e.g. not 65535)
        and Stage [index].AddRank = 0
        and Stage [index].DelRank = 0)
            ⎡set stage[index].AddRank = 15⎤
            ⎣set stage[index].DelRank = 0 ⎦
    elseif (Stage[index].AddRank ! = 0
        and Stage[index].DelRank ! = 0)
            ⎡set stage[index].AddRank = 15⎤
            ⎣set stage[index].DelRank = 0 ⎦
    else
            [do nothing]
    endif
endrepeat y = 0                    ! stage y has the lowest runtime hours
Lowest Runtime = 65535
Boiler On Tot = 0
v = 0                    ! stage v has the high runtime hours
Highest Runtime = 0
Comment:
calculate add ranks of runtimes ——►calculate ADD ranks of Runtime
repeat for Boiler index 1 to MAXSTAGES
    if (Stage[index].Heat Stage Runtime ! = INVALID)
        and Stage[index].AddRank ! = 0⎤
        and Stage[index].DelRank = 0) ⎦ current stage is off
        and Stage[index].Heat Stage Runtime ≤ lowest Runtime
            ⎡Lowest Runtime = Stage[index].HeatStageRuntime
            ⎣y = [index]
    endif
                                        ——►calculate DEL ranks
    ⎡if (Stager[index].1AddRank = 0       ⎤
    ⎣and (Stager[index].DelRank ! = 0⎦ current stage is on
            ⎡if (NumberofStages Requested = 0)
            ⎢    ⎡set Stage[index].AddRank = 15⎤
            ⎢    ⎣set Stage[index].DelRank = 0 ⎦ setTotalOnStages++
            ⎢else if(Stage[index].Heat Stage Runtime ≥ Highest Runtime
            ⎢    ⎡Highest Runtime = Stage[index].Heat Stage Runtime
            ⎣    ⎣v = [index]
            endif
    endif
endrepeat AddStages
if (number of Stages Requested ≥ Total On Stages)
    !requested stages are greater than what is currently on So add stages!
    !stage y has the lowest runtime total so add it first
    ⎡set stage[index].AddRank = 0⎤
    ⎣set stage[index].DelRank = 0⎦ set stage on!
elsseif (number of Stages Requested < BlrOnTol
    !requested stages are less than what is currently on so del stages!
    !stage v has the highest runtime total
    ⎡set stage[index].AddRank = 15⎤
    ⎣set stage[index].DelRank = 0 ⎦ set stage off!
else
    no change
end if
```

We claim:

1. A system of controllers acting as nodes on a network and providing automatic self configuration comprising:

a first node having means for broadcasting a default identifier in a default domain;

means for designating said first node as a supervisory node;

a plurality of second nodes with each second node being a client node and having means for broadcasting a default identifier in said default domain;

a communication medium coupling said supervisory node and each said client node;

means at said first node for receiving and ranking said default identifier from each said client node;

means at said first node for creating a network address for each said client node and communicating said network address in said default domain; and means at each said client node for receiving and internalizing said assigned network address thereby enabling communication of control information between said supervisory node and each said client node in a domain that is not said default domain.

2. The system of claim 1 wherein said means for designating said first node as a supervisory node comprises a selected electrical connection at said first node.

3. The system of claim 1 wherein said default domain allows communication between nodes without utilizing a subnet and node address.

4. The system of claim 1 wherein said network address in a domain that is not said default domain comprises a subnet and node address.

5. The system of claim 1 wherein said network utilizes a LonWorks protocol and said nodes are Neuron-based nodes.

6. The system of claim 5 wherein said first identifier comprises a Neuron ID.

7. The system of claim 1 wherein said control information is selected from the group consisting of analog values, status, mode, alarm, and control commands.

8. The system of claim 1 wherein said means at said first node for creating a network address and said means at said each said client node for receiving and internalizing said assigned network address comprises a technique of binding network variables.

9. The system of claim 6 wherein said means at said first node for creating a network address and said means at each said client node for receiving and internalizing said assigned network address comprises a technique of binding network variables.

10. A system of controllers acting as nodes on a network and providing automatic self-configuration comprising:

a first node having means for broadcasting a default identifier, said first node being addressable in a first domain by a first domain address;

means for designating said first node as a supervisory node;

a plurality of second nodes with each second node having means for broadcasting a default identifier, each said second node designated as a client node and addressable in said first domain by a first domain address;

a communication medium coupling said supervisory node and each said client node;

means at said supervisory node for receiving and storing said default identifier from each client node in a predefined array;

means at said supervisory node for assigning a second identifier to each said client node and communicating said second identifier to each said client node; and means at each client node for changing said first domain address of said client node to a network address in a second domain thereby enabling communication of control information between said supervisory node and each said client node.

11. The system of claim 10 wherein said first domain allows communication between nodes without a subnet and node address.

12. The system of claim 10 wherein said network address in a second domain comprises a subnet and node address.

13. The system of claim 10 wherein said control information is selected from the group consisting of analog values, status, mode, alarm, and control commands.

14. The system of claim 10 wherein said means for designating said first node as a supervisory node comprises a selected electrical connection at said first node.

15. The system of claim 10 wherein said network utilizes a LonWorks protocol and said nodes are Neuron based nodes.

16. The system of claim 10 wherein said means at said supervisory node for communicating said second identifier and said means at said each said client node for changing said first domain address of said client node to a network address in a second domain comprises a technique of binding network variables.

17. The system of claim 15 wherein said default identifier for a second node comprises a Neuron ID.

18. A method of configuring controllers to allow communication on a network comprising the steps of:

providing controllers, with each controller having a first identifier and being configured from a default value to communicate said first identifier;

designating one controller as a supervisory node;

designating each remaining controller as a client node;

connecting said supervisory node and each remaining controller to a network;

initializing operation of said controllers;

communicating said first identifiers;

storing said first identifiers in an array at said supervisory node, with said first identifiers stored according to a characteristic contained in said first identifiers; and assigning a second identifier to each remaining controller, said second identifier enabling said supervisory node to communicate control information; and communicating control information between said supervisory node and each remaining controller.

19. The method of claim 18 wherein said step of designating one controller as a supervisory node comprises the step of making an electrical connection at said one node.

20. The method of claim 18 wherein said step of assigning a second identifier comprises assigning subnet node addressing.

21. The method of claim 18 wherein said step of communicating control information comprises communicating information selected from the group consisting of analog values, status, mode, alarm, and control commands.

22. The method of claim 20 wherein said network utilizes a standard communication protocol.

23. The method of claim 22 wherein said standard communication protocol is LonWorks.

* * * * *